(12) United States Patent
Zalewski et al.

(10) Patent No.: US 11,161,408 B2
(45) Date of Patent: Nov. 2, 2021

(54) THREE SPEED TRANSFER CASE FOR FOUR WHEEL DRIVE VEHICLES

(71) Applicant: MAGNA POWERTRAIN OF AMERICA, INC., Troy, MI (US)

(72) Inventors: John Zalewski, Lake Orion, MI (US); Michael Bujold, Royal Oak, MI (US); Ryan Strand, Rochester Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 0 days.

(21) Appl. No.: 17/097,936

(22) Filed: Nov. 13, 2020

(65) Prior Publication Data

US 2021/0146775 A1 May 20, 2021

Related U.S. Application Data

(60) Provisional application No. 62/935,108, filed on Nov. 14, 2019.

(51) Int. Cl.
*B60K 17/346* (2006.01)
*F16H 3/54* (2006.01)

(52) U.S. Cl.
CPC .......... *B60K 17/3467* (2013.01); *F16H 3/54* (2013.01); *F16H 2200/0017* (2013.01); *F16H 2200/2007* (2013.01)

(58) Field of Classification Search
CPC ................. B60K 17/3467; F16H 3/54; F16H 2200/2007; F16H 2200/0017
See application file for complete search history.

(56) References Cited

U.S. PATENT DOCUMENTS

| | | | |
|---|---|---|---|
| 6,575,867 B1 * | 6/2003 | Stephens | B60K 17/3467 180/248 |
| 6,612,959 B2 | 9/2003 | Frost | |
| 6,712,729 B2 | 3/2004 | Stephens et al. | |
| 7,175,558 B2 * | 2/2007 | Puiu | F16D 28/00 475/225 |
| 2007/0191117 A1 * | 8/2007 | Mueller | F16D 7/10 464/37 |
| 2010/0326226 A1 | 12/2010 | Walston | |

\* cited by examiner

*Primary Examiner* — Justin Holmes
(74) *Attorney, Agent, or Firm* — Dickinson Wright PLLC

(57) ABSTRACT

A multi-speed transfer case equipped with a planetary reduction gearset and a range clutch disposed between an input shaft and an output shaft. A clutch actuation mechanism controls actuation of the range clutch to establish distinct ratio drive connections between the input shaft and the output shaft.

20 Claims, 26 Drawing Sheets

THREE SPEED TRANSFER CASE FOR FOUR WHEEL DRIVE VEHICLES

CROSS-REFERENCE TO RELATED APPLICATION

This application claims the benefit of U.S. Provisional Patent Application No. 62/935,108, filed Nov. 14, 2019 and titled "THREE SPEED TRANSFER CASE FOR FOUR WHEEL DRIVE VEHICLES," which is hereby incorporated by reference in its entirety.

FIELD

The present disclosure relates generally to power transfer systems for controlling the distribution of drive torque from the powertrain to the front and rear drivelines of a four-wheel drive (4WD) motor vehicle. More particularly, the present disclosure is directed to a transfer case for use in 4WD vehicles equipped with a three-speed planetary-type reduction gearset and a range clutch operably disposed between an input shaft and an output shaft, and a clutch actuation arrangement configured to control actuation of the range clutch for establishing three different ratio drive connections therebetween.

BACKGROUND

This section provides background information related to 4WD vehicles and transfer cases which is not necessarily prior art to the inventive concepts associated with the present disclosure.

In view of the continuing popularity of four-wheel drive (4WD) vehicles, power transfer systems are currently utilized in vehicular drivetrain applications for controlling the distribution of power (i.e., drive torque) from the powertrain to all four wheels of the vehicle. In many 4WD vehicles, the power transfer system includes a transfer case arranged to interconnect the powertrain to the primary (i.e., rear) driveline and the secondary (i.e., front) driveline and which is equipped with a multi-plate friction clutch assembly (i.e., mode clutch) and a power-operated actuator (i.e., mode clutch actuator) that are interactively associated with an electronically-controlled traction control system. During normal road and operating conditions, the mode clutch is maintained in a released state with the mode clutch actuator in a non-actuated state such that drive torque is only transmitted from the powertrain to the rear driveline, whereby a two-wheel drive (2WD) mode is established. However, when the traction control system detects a low traction condition, the mode clutch actuator is shifted into an actuated state to place the mode clutch in an engaged state for transmitting drive torque from the powertrain to both the front and rear drivelines, whereby a 4WD mode is established. The amount of drive torque transmitted to the front driveline can be varied as a function of specific vehicle dynamics and road conditions to establish an adaptive (i.e., on demand) 4WD mode, commonly referred to as AUTO-4WD. In some situations, the mode clutch can be held in its fully engaged state to effectively lock the front and rear drivelines and establish a part-time 4WD mode, commonly referred to as a LOCK-4WD mode.

In addition to controlling the amount of drive torque transmitted through the mode clutch, many transfer cases are also equipped with a planetary-type reduction gearset and a range clutch assembly (i.e., range clutch) operable via control of a power-operated actuator (i.e., range clutch actuator) to establish a direct-ratio (i.e., high-range) and a reduced-ratio (i.e., low-range) drive connection upstream of the mode clutch. In many "two-speed" transfer cases, the mode clutch actuator and the range clutch actuator are associated with an integrated clutch actuation arrangement such as is shown, for example, in U.S. Pat. No. 7,644,598. In this arrangement, the range clutch and the mode clutch are aligned along a common axis and rotation of a motor-driven actuator shaft controls operation of a scissor-type ballramp mode clutch actuator as well as a cam-type range clutch actuator. In other two-speed transfer cases, the mode clutch actuator and the range clutch actuator are associated with a non-integrated clutch actuation arrangement such as is shown, for example, in U.S. Publication No. US2016/0363201. In this arrangement, the range clutch is aligned along a first (i.e., rear output shaft) axis while the mode clutch is aligned along a second (i.e., front output shaft) axis.

The particular reduced-ratio drive connection established in most two-speed transfer cases is dictated by the gear geometry of the geared components associated with the planetary-type reduction gearset. In this regard, virtually all conventional two-speed transfer cases are configured to establish a reduced-ratio drive connection selected between one of a standard (i.e., 2.72:1) low-range ratio and a deeper (i.e., 4.0:1) low-range ratio used in more limited applications where additional torque is required for improved tractive capability in climbing difficult and steeply graded terrains.

True off-road enthusiasts are interested in 4WD vehicles equipped with a transfer case capable of providing more than just the two range (i.e., high-range and low-range) options. To this end, some transfer cases have been developed to provide a pair of reduced-ratio drive connections in addition to the direct-ratio drive connection. For example, U.S. Pat. No. 6,575,876 discloses a "three-speed" transfer case equipped with a first planetary-type reduction gearset configured to provide the high-range and standard low-range drive connections and a second planetary-type reduction gearset configured to provide the deeper low-range drive connection. As an alternative, a conventional two-speed transfer case can be combined with an "add-on" (i.e., adaptor) unit equipped with a second planetary gearset for providing the deeper low-range drive connection. However, both alternatives are expensive and require additional installation space due to the integration of the second planetary gearset.

In both alternative arrangements mentioned above for providing three speed ranges, the requirement of using two planetary gearsets acts to limit the ability to establish a pair of more "preferred" low-range reduction ratios for enhanced off-road functionality. Specifically, in addition to the typical direct high-range ratio, off-road enthusiasts would prefer a first low-range ratio (i.e., about 1.5 to 2:1) which is numerically smaller than the standard low-range ratio and a second low-range ratio (i.e., about 5.2:1) which is numerically larger than the deeper low-range ratio. The first low-range ratio would be beneficial for higher speed driving on trails and/or sand. In contrast, the second low-range ratio would be beneficial for improved rock crawling operation during which the highest torque transfer capability is desired.

Thus, a recognized need exists to develop a three-speed transfer case providing enhanced off-road functionality while improving upon the cost and packaging requirements associated with the prior art arrangements.

SUMMARY

This section provides a general summary of various aspects objectives and features associated with some of the inventive concepts embodied in the three-speed transfer cases of the present disclosure. However, this summary is not intended to be interpreted as a complete and comprehensive listing of all such aspects, objectives and features and therefore does not limit the present disclosure to only those inventive concepts specifically mentioned herein.

It is a general aspect of the present disclosure to provide a three-speed transfer case for use in four-wheel drive (4WD) vehicles and which is capable of establishing a first (i.e., high-range) ratio drive connection a second (i.e., low-range) ratio drive connection, and a third (i.e., crawler-range) ratio drive connection.

It is a related aspect of the present disclosure to define the first ratio drive connection as a direct (1:1) ratio, the second ratio drive connection as a first reduced ratio (about 1.5 to 2.0:1) which is numerically smaller than conventional low-range ratios, and the third ratio drive connection as a second-reduced ratio (about 5.2:1) which is numerically larger than conventional deep low-range ratios.

It is another related aspect of the present disclosure to equip the three-speed transfer case with a planetary gearset and a range clutch operably disposed between an input shaft and an output shaft and which are configured to establish the three different ratio drive connections therebetween.

In addition to the above aspects, the three-speed transfer case of the present disclosure is equipped with a mode clutch operable, in cooperation with the planetary gearset and the range clutch, to establish various distinct drive modes including a two-wheel high-range (2H) drive mode, a four-wheel high-range (4H) drive mode, a four-wheel low-range (4L) drive mode, and a four-wheel crawler-range (4C) drive mode.

It is a related aspect of the present disclosure to provide the three-speed transfer case with a range clutch actuation system for controlling actuation of the range clutch and a mode clutch actuation system for controlling actuation of the mode clutch which function cooperatively to establish the above-noted drive modes.

It is another related aspect of the present disclosure to provide the three-speed transfer case with either manually-operated or power-operated versions of the range clutch actuation system and the mode clutch actuation system.

In accordance with these and other aspects, the present disclosure is directed to a three-speed transfer case, comprising: an input shaft adapted to be driven by a powertrain; a first output shaft driving a first driveline; a second output shaft driving a second driveline; a transfer mechanism connected to the second output shaft; a mode mechanism operable in a first mode state to couple the transfer mechanism to the first output shaft and in a second mode state to uncouple the transfer mechanism from the first output shaft; a mode shift mechanism for shifting the mode mechanism between the first and second mode states; a planetary gearset having a first sun gear driven by the input shaft, a second sun gear, a non-rotary ring gear, a carrier unit, first planet gears rotatably supported by the carrier unit and meshed with the first sun gear, and second planet gears rotatably supported by the carrier unit and meshed with the ring gear and the second sun gear; a range mechanism operable in a first range state to establish a direct ratio drive connection between the input shaft and the first output shaft, operable in a second range state to establish a first reduced ratio drive connection between the input shaft and the first output shaft, and operable in a third range state to establish a second reduced ratio drive connection between the input shaft ad the first output shaft; and a range shift mechanism for shifting the range mechanism between its three distinct range states.

In accordance with a first non-limiting alternative, the range mechanism includes a range collar couple for rotation and sliding movement with the first output shaft. The range collar is operable in a first range position to couple the first output shaft to the input shaft and establish the direct ratio drive connection. The range collar is further operable in a second range position to couple the first output shaft to the second sun gear of the planetary gearset and establish the first reduced ration drive connection. Further, the range collar is operable in a third range position to couple the first output shaft to the carrier unit of the planetary gearset and establish the second reduced ratio drive connection.

The above-mentioned arrangement is further configured such that one of the input shaft and the first sun gear includes first clutch teeth, the second sun gear includes second clutch teeth, and the carrier unit includes third clutch teeth. The range collar is operable in its first range position to engage the first clutch teeth and disengage the second and third clutch teeth. The range collar is operable in its second range position to engage the second clutch teeth and disengage the first and third clutch teeth. The range collar is further operable in its third range position to engage the third clutch teeth and disengage the first and second clutch teeth.

In accordance with the present disclosure, the range collar may include first range teeth adapted to engage the first clutch teeth when located in its first range position, second range teeth adapted to engage the second clutch teeth when located in its second range position, and third range teeth adapted to engage the third clutch teeth when located in its third range position.

In accordance with the present disclosure, the range collar may include first range teeth adapted to engage the first clutch teeth when located in its first range position, and second range teeth adapted to engage the second clutch teeth when located in its second range position and to engage the third clutch teeth when located in its third range position.

In accordance with the present disclosure, the range mechanism may further include a second range collar fixed for rotation with and sliding movement on the first range collar between a released position and an engaged position. The first range state is established when the range collar is located in its first range position and the second range collar is located in its released position. The second range state is established when the range collar is located in its second range position and the second range collar is located in its released position. The third range state is established when the range collar is located in a neutral position between its first and second positions and the second range collar is located in its engaged position.

The three-speed transfer case of the present disclosure may also include a disconnect clutch disposed between the input shaft and the first sun gear. The disconnect clutch functions is a first state to disconnect the planetary gearset from driven connection with the input shaft and in a second state to drivingly connect the planetary gearset to the input shaft.

In accordance other aspects, the present disclosure is directed to a three-speed transfer case, comprising: an input shaft adapted to be driven by a powertrain; a first output shaft driving a first driveline; a second output shaft driving a second driveline; a transfer mechanism connected to the second output shaft; a mode mechanism operable in a first mode state to couple the transfer mechanism to the first output shaft and in a second mode state to uncouple the transfer mechanism from the first output shaft; a mode shift mechanism for shifting the mode mechanism between the first and second mode states; a planetary gearset having a first sun gear driven by the input shaft, a second sun gear, a non-rotary ring gear, a carrier unit, first planet gears rotatably supported by the carrier unit and meshed with the first sun gear, and second planet gears rotatably supported by the carrier unit and meshed with the ring gear and the second sun gear; a range mechanism operable in a first range state to establish a direct ratio drive connection between the input shaft and the first output shaft, operable in a second range state to establish a first reduced ratio drive connection between the input shaft and the first output shaft, and operable in a third range state to establish a second reduced ratio drive connection between the input shaft ad the first output shaft; and the range shift mechanism operable for shifting the range mechanism between more than three distinct range states.

The more than three distinct range states may include five range positions for establishing each of five distinct range states, wherein the five distinct range states includes three driving states and two non-driving states. The range mechanism may include a range collar coupled for rotation with the first output shaft and axially moveable between the plurality of distinct ranges states that include a first neutral position and a second neutral position. One of the input shaft and the first sun gear may include first clutch teeth, a second sun gear includes second clutch teeth, and the carrier unit includes third clutch teeth. The range collar is operable in its first range position to engage the first clutch teeth and disengage the second and third clutch teeth, wherein the range collar is operable in its third range position to engage the third clutch teeth and disengage the first and second clutch teeth. The first range teeth are disengaged from first clutch teeth and the second range teeth are disengaged from the second clutch teeth the on second sun gear in the first neutral position, wherein the first range teeth are disengaged from first clutch teeth and the second range teeth are disengaged from the third clutch teeth the on second sun gear in the second neutral position, and wherein a positioning of the range collar in the first neutral position and a positioning of the range collar in the second neutral position are common.

Further areas of applicability will become apparent from the description provided herein. As understood, the description and specific example of various embodiments listed in this summary are only intended to illustrate some of the inventive concepts and are not intended to limit the full and fair scope of protection afforded to the present disclosure.

DRAWINGS

The drawings described herein and appended to this application provide non-limiting illustrations of selected embodiments and are not intended to limit the scope of the present disclosure.

DETAILED DESCRIPTION

Figure 1:
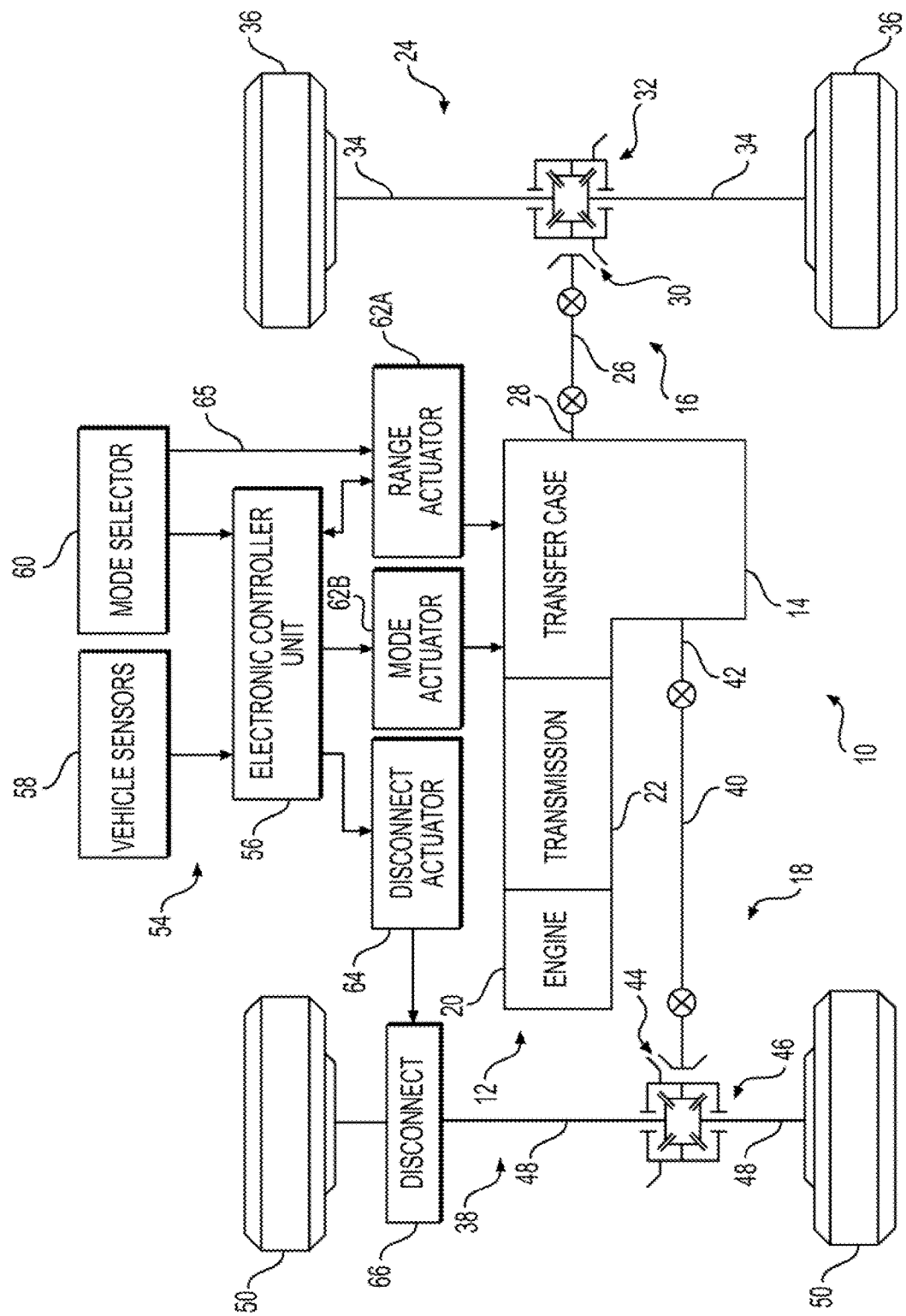
FIG. 1 is a schematic illustration of a four-wheel drive (4WD) motor vehicle equipped with a power transfer system having a two-speed active transfer case constructed in accordance with the prior art.

Example embodiments will now be described more fully with reference to the accompanying drawings. In particular, at least four example embodiments of a three-speed transfer case adapted for use with four-wheel drive vehicles are provided so that this disclosure will be thorough and will fully convey the true and intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example drivetrain for a four-wheel drive (4WD) motor vehicle 10 is shown to include a powertrain 12 operable to generate rotary power (i.e., drive torque) which is transmitted through a power transfer unit, hereinafter transfer case 14, to a primary driveline 16 and to a secondary driveline 18. Powertrain 12 is shown, in this non-limiting example, to include a power source such as an internal combustion engine 20 and a transmission 22. In the particular arrangement shown, primary driveline 16 is a rear driveline and generally includes a rear axle assembly 24 and a rear propshaft 26 arranged to drivingly interconnect a rear output shaft 28 of transfer case 14 to an input of rear axle assembly 24. The input to rear axle assembly 24 includes a hypoid gearset 30 connected to rear propshaft 26. Rear axle assembly 24 includes a rear differential assembly 32 driven by hypoid gearset 30, and a pair of rear axleshafts 34 interconnecting rear differential assembly 32 to a pair of ground-engaging rear wheels 36. Secondary driveline 18 is a front driveline and includes a front axle assembly 38 and a front propshaft 40 arranged to drivingly interconnect a front output shaft 42 of transfer case 14 to an input of front axle assembly 38. The input to front axle assembly 38 includes a hypoid gearset 44 connected to front propshaft 40. Front axle assembly 38 includes a front differential assembly 46 driven by hypoid gearset 44, and a pair of front axleshafts 48 interconnecting front differential assembly 46 to a pair of ground-engaging front wheels 50.

Motor vehicle 10 is also shown to include a traction control system 54 having an electronic controller unit (ECU) 56 configured to receive input signals from vehicle sensors 58 and a mode selector 60 and to subsequently provide control signals to one or more actuators. Mode selector 60 is, in this non-limiting example, a manually-operable device within the passenger compartment of vehicle 10 and, for example, may include a push button, rotary knob or shift lever. ECU 56 provides control signals to a transfer case actuator 62 and an axle disconnect actuator 64. As will be detailed with greater specificity, transfer case actuators 62 may include a range actuator 62A associated with a two-speed range mechanism to provide high-range and low-range drive connections, and a mode actuator 62B associated with a mode mechanism to provide two-wheel drive and four-wheel drive modes of operation.

Mode selector 60 provides a mode signal to ECU 56 that is indicative of the particular drive mode selected. Disconnect actuator 64 controls operation of a disconnect device 66 associated with front axle assembly 38 for selectively coupling and uncoupling front driveline 18 relative to transfer case 14. Sensors 58 are configured to provide information to ECU 56 indicative of the current operational characteristics of vehicle 10 and/or road conditions for use in controlling operation of transfer case 14. The information provided by sensors 58 may include, without limitations, information related to vehicle speed, driveline/wheel speeds, acceleration, braking status, steering angle, throttle position, lateral displacement, and/or rain sensors. Mode selector 60 permits a vehicle operator to select operation of vehicle 10 in one of the available drive modes which may include, without limitation, a two-wheel high-range (2H) drive mode, an automatic four-wheel high-range (AUTO-4H) drive mode, a locked four-wheel high-range (LOCK-4H) drive mode, a Neutral mode, a locked four-wheel low-range (LOCK-4L) drive mode, and an automatic four-wheel low-range (AUTO-4L) drive mode.

Figure 2:
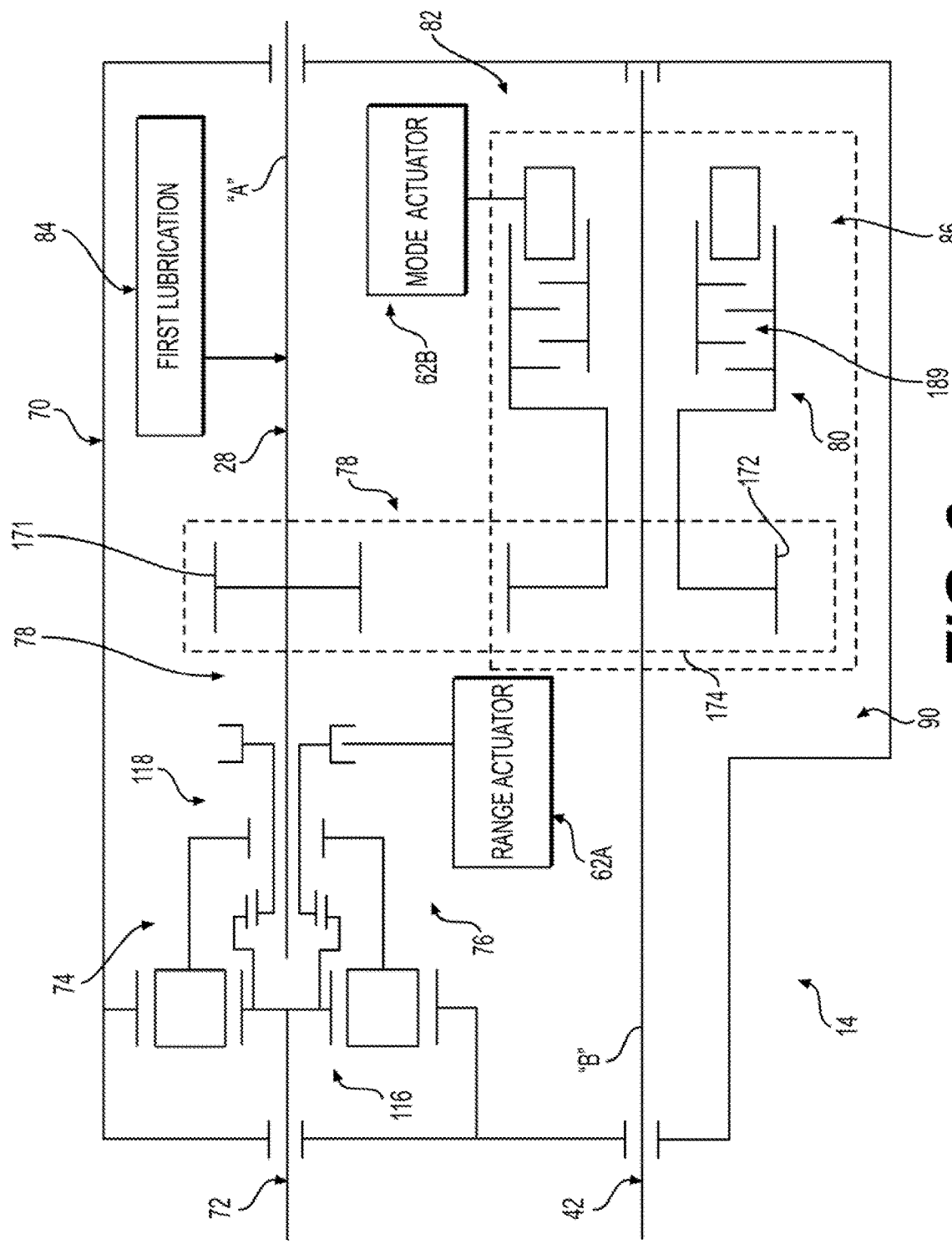
FIG. 2 is a diagrammatical illustration of the conventional two-speed transfer case shown in FIG. 1.

Referring now to FIG. 2 of the drawings, a stick diagram of an exemplary and otherwise conventional embodiment of two-speed transfer case 14 is provided. Transfer case 14 is generally shown to include: a housing assembly 70; an input shaft 72 rotatably supported by housing assembly 70; a two-speed range mechanism 74 disposed between input shaft 72 and rear output shaft 28; a range shift mechanism 76 controlling operation of two-speed range mechanism 74; a transfer mechanism 78 driven by rear output shaft 28; a mode mechanism 80 disposed between transfer mechanism 78 and front output shaft 42; a mode shift mechanism 82 controlling operation of mode mechanism 80; a first lubrication mechanism 84 associated with rear output shaft 28; and a second lubrication mechanism 86 (shown in phantom lines) associated with front output shaft 42. As is evident, range mechanism 74 is arranged in association with a first rotary axis "A" of transfer case 14 while mode mechanism 80 is arranged in association with a second rotary axis "B" of transfer case 14. With transfer case 14 installed in vehicle 10, the first axis is generally parallel but offset above the second axis with housing assembly 70 configured to define a sump area 90 filled with a lubricating oil in an area generally configured to locate at least a portion of mode mechanism 80 within sump area 90. Transfer case 14 is also shown in FIG. 2 to include range actuator 62A in association with range shift mechanism 76, and mode actuator 62B in association with mode shift mechanism 80 which are controlled by ECU 56.

Figure 3A:
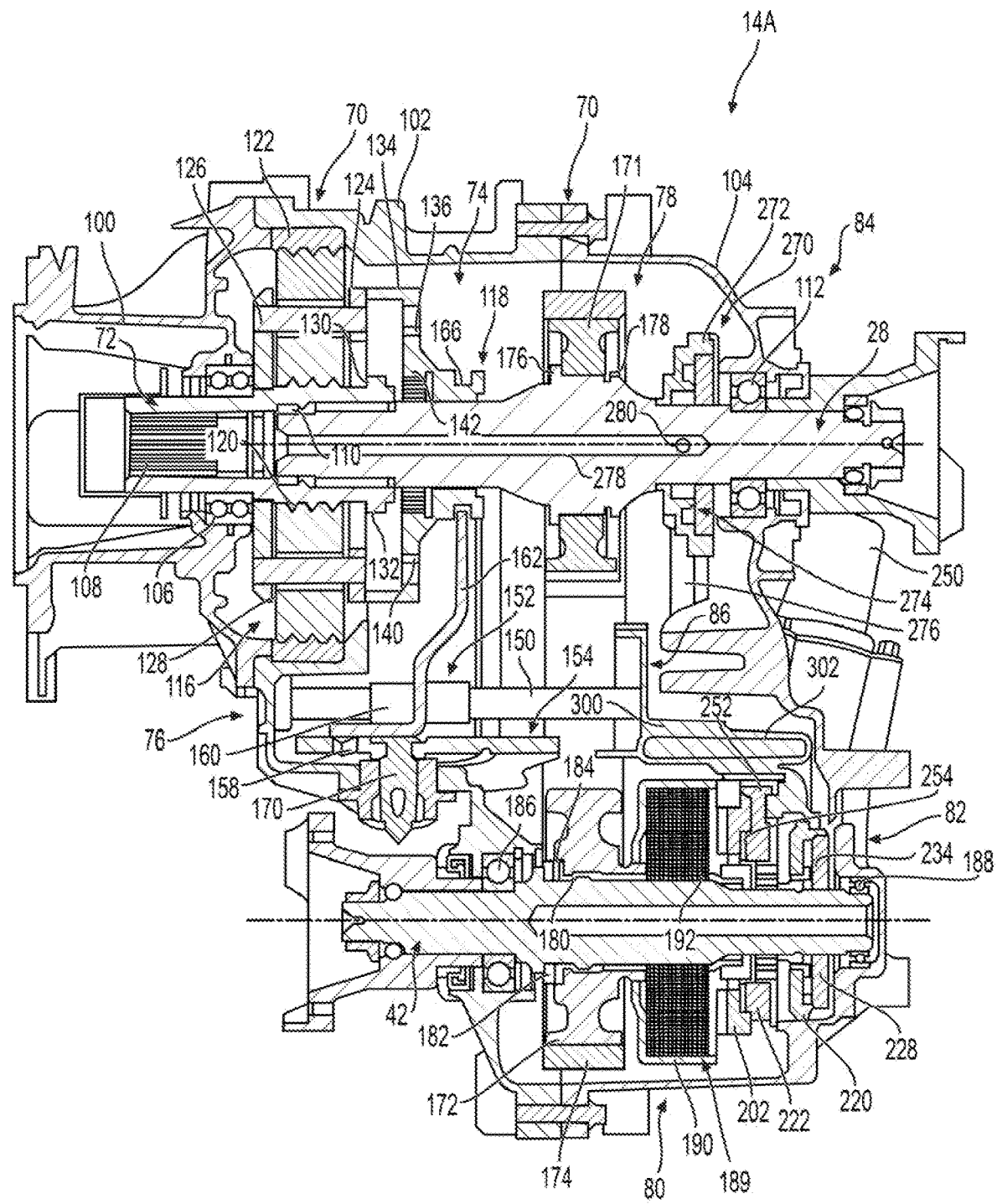
FIG. 3A is a sectional view of the conventional two-speed transfer case shown in FIG. 2.

With particular reference now to FIG. 3A, two-speed transfer case 14 originally shown in FIGS. 1 and 2 is shown in grater detail. Housing assembly 70 is shown, in this non-limiting example, to include a multi-piece configuration having an adapter housing section 100, a front housing section 102, a rear housing section 104, and a rear end cap 105. Adapter housing section 100 is configured to be rigidly secured to transmission 22 and includes a bearing assembly 106 rotatably supporting input shaft 72. Input shaft 72 includes internal splines 108 adapted to matingly engage with external splines of a transmission output shaft. Rear output shaft 28 is supported for rotation relative to input shaft 72 by a first bearing assembly 110 disposed between input shaft 72 and rear output shaft 28, and a second bearing assembly 112 disposed between rear housing section 104 and rear output shaft 28.

Range mechanism 74 is shown to include a planetary gearset 116 and a range clutch 118. Planetary gearset 116 includes a sun gear 120 formed integrally on input shaft 72, a ring gear 122 non-rotatably fixed to front housing section 102, a carrier unit 124 having a plurality of pins 126, and a plurality of planet gears 128 each rotatably mounted (via a bearing assembly) on a corresponding one of pins 126 and which are each in constant meshed engagement with sun gear 120 and ring gear 122. Input shaft 72 includes a clutch ring segment 130 having external clutch teeth 132 formed thereon. Carrier unit 124 includes a clutch ring segment 134 having internal clutch teeth 136 formed thereon. Range clutch 118 is configured as a sliding range collar that is splined for common rotation with rear output shaft 28. Range collar 118 also includes external clutch teeth 140 and internal clutch teeth 142. Range clutch 118 is axially moveable on rear output shaft 28 between three (3) distinct range positions to establish two (2) different ratio drive connections between input shaft 72 and rear output shaft 28.

Range collar 118 is moveable between a high-range (H) position, a neutral (N) position, and a low-range (L) position. When range collar 118 is located in its H range position, its internal clutch teeth 142 engage external clutch teeth 132 on input shaft 72 so as to establish a first or "direct" (i.e., high-range) ratio drive connection between input shaft 72 and rear output shaft 28. In contrast, when range collar 118 is located in its L range position, its external clutch teeth 140 engage internal clutch teeth 136 on carrier unit 124 so as to establish a second or "reduced" (i.e., low-range) ratio drive connection between input shaft 72 and rear output shaft 28. Location of range collar 118 in its N position disengages rear output shaft 28 from driven connection with input shaft 72 and carrier unit 124 so as to interrupt the transfer of drive torque and permit relative rotation therebetween. Accordingly, the high-range drive connection is established when range collar 118 is located in its H range position and the low-range drive connection is established when range collar 118 is located in its L range position. The two-speed range mechanism shown and described is intended to exemplify any conventional gear reduction device capable of establishing two distinct speed ratio drive connections between input shaft 72 and rear output shaft 42.

Range shift mechanism 76 is shown to include a shift rail 150 mounted between front and rear housing sections 102 and 104 of housing assembly 70, a range fork unit 152 slideably disposed on shift rail 150, and a rotary sector plate 154 having a contoured range slot 156 within which a range pin 158 extends. Range pin 158 extends outwardly from a tubular hub segment 160 of range fork unit 152 such that rotation of sector plate 154 causes linear movement of range fork unit 152 due to range pin 158 moving within range slot 156. Range fork unit 152 further includes a fork segment 162 extending outwardly from tubular hub segment 160 and having a pair of bifurcated forks 164 that are retained in an annular groove 166 formed in range collar 118. Therefore, axial movement of range fork unit 152 results in sliding movement of range collar 118 between its three distinct range positions. While not specifically shown, the power-operated version of range actuator 62A may include an electric motor for rotatably driving a sector shaft 170 that is, in turn, coupled to sector plate 154 so as to move range collar 118 into the desired range position in response to rotation of sector shaft 170. As an alternative, range actuator 62A may include a mechanical linkage assembly interconnecting the shift lever in the passenger compartment of vehicle 10 to sector shaft 170 and which is operable to cause rotation of sector plate 154 in response to movement of the shift lever. Those skilled in the art will appreciate that any suitable arrangement capable of axially moving range fork unit 152 to facilitate movement of range collar 118 between its three (3) distinct range positions is within the meaning of range actuator 92.

Transfer mechanism 78 is shown to include a first transfer component driven by rear output shaft 28 and which is arranged to transfer drive torque to a second transfer component rotatably supported on front output shaft 42. Transfer mechanism 78 is a chain and sprocket type of drive assembly including a first sprocket 171 acting as the first transfer component, a second sprocket 172 acting as the second transfer component, and an endless power chain 174 (FIG. 3B) encircling first sprocket 171 and second sprocket 172. First sprocket 171 is splined for common rotation with rear output shaft 28 and is axially retained between a radial flange 176 and a snap-ring 178. Second sprocket 172 is rotatably mounted on front output shaft 42 via a needle bearing assembly 180. A retainer ring 182 and a radial thrust bearing assembly 184 are also disposed between second sprocket 172 and front output shaft 42. Front output shaft 42 is rotatably supported by housing assembly 70 via a pair of laterally-spaced roller bearing units 186 and 188. It is contemplated that alternative transfer mechanisms, such as gear drive arrangements, can be used with transfer case 14A to transfer drive torque from rear output shaft 28 to a transfer component rotatably supported on front output shaft 42.

Mode mechanism 80 is shown to include a wet-type friction clutch assembly 189 disposed between second sprocket 172 and front output shaft 42 for facilitating adaptive torque transfer therebetween. Friction clutch assembly 189 generally includes a first clutch member or clutch drum 190 fixed for common rotation with second sprocket 172, a second clutch member or clutch hub 192 mounted to, formed integrally with, an intermediate section of front output shaft 42, and a multi-plate clutch pack 193 comprised of alternatively interleaved outer clutch plates 194 and inner clutch plates 196. Outer clutch plates 194 are splined for rotation with clutch drum 190 while inner clutch plates 196 are splined for rotation with clutch hub 192. Clutch drum 190 is a formed component and includes a plurality of oil transfer holes (not shown) configured to permit lubricant to flow therethrough. A spacer ring 198 is provided between drum 190 and second sprocket 172.

Figure 3B:
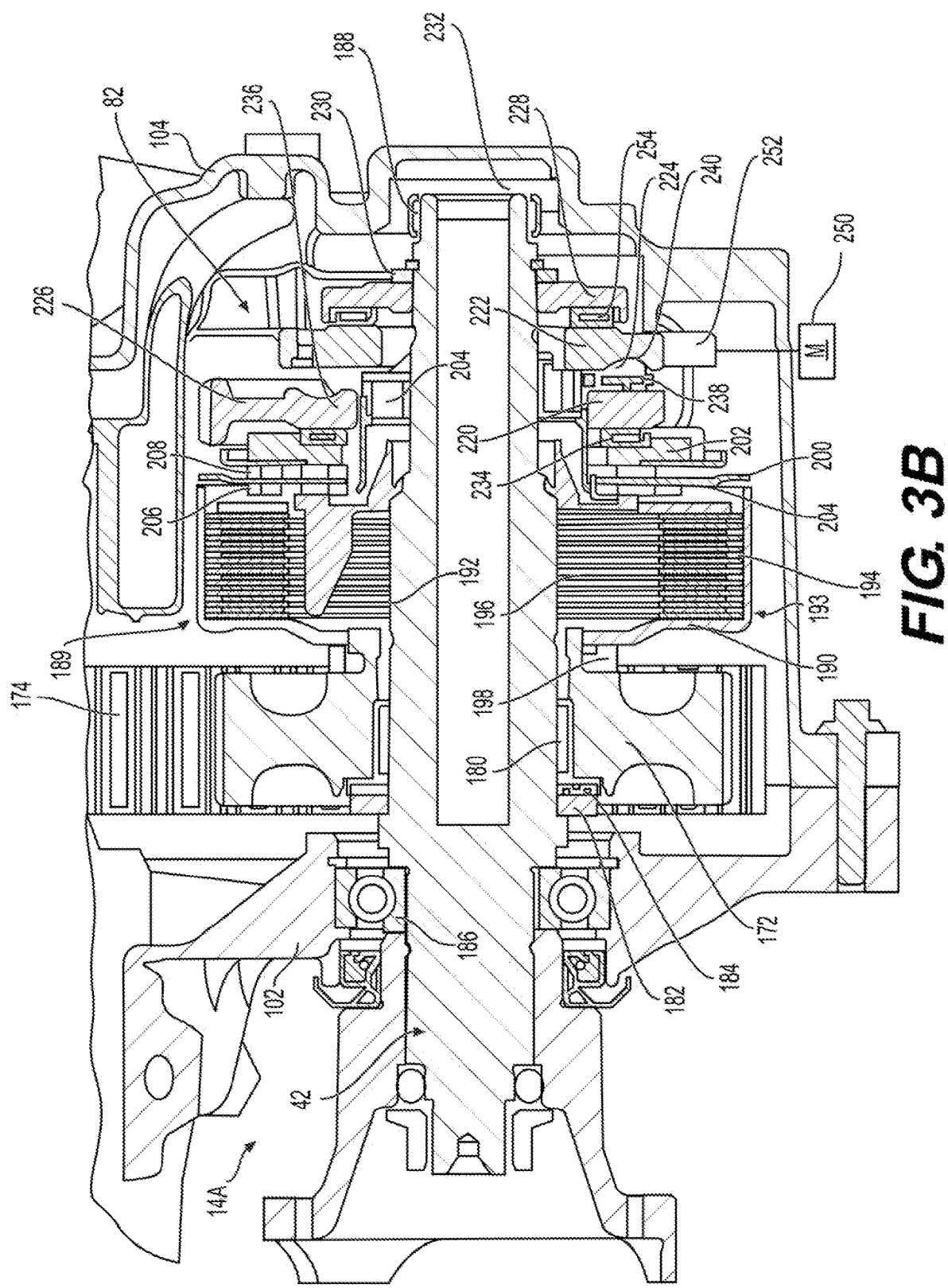
FIG. 3B is an enlarged partial sectional view showing various components of the active mode clutch shown in FIGS. 2 and 3A.

With reference now to both FIGS. 3A and 3B, the friction clutch assembly 189 also includes a spring retainer ring 200 fixed (via splines, lugs, etc.) for common rotation with clutch drum 190, an axially-moveable apply plate 202 that is connected for common rotation with spring retainer ring 200, and a plurality of circumferentially aligned return springs 204 disposed between spring retainer ring 200 and apply plate 202. As will be detailed, return springs 204 are configured and arranged to normally bias apply plate 202 in a direction toward a retracted position relative to clutch pack 193. Apply plate 202 includes a plurality of axially-extending and circumferentially-aligned drive lugs 206, which extend through window apertures 208 formed in spring retainer ring 200. Drive lugs 206 are configured to engage and apply a clutch engagement force on clutch pack 193, the magnitude of which controls the amount of drive torque that is transferred from clutch drum 190 to clutch hub 192 through clutch pack 193. While mode mechanism 80 is shown preferably configured as a multi-plate wet-type friction clutch assembly, those skilled in the art will recognize that such a mode mechanism is intended to represent any type of actively-controlled mode clutch or coupling capable of selectively coupling front output shaft 42 for rotation with second sprocket 172 of transfer mechanism 78 for facilitating the transfer of drive torque to front driveline 18.

Mode shift mechanism 82 is shown to include a motor-driven rotary-to-linear conversion device of the type commonly referred to as a ballramp unit. The ballramp unit generally includes a first cam ring 220, a second cam ring 222, and followers 224 disposed in aligned cam tracks formed therebetween. First cam ring 220 is non-rotatably fixed to housing assembly 70 via an anti-rotation tab 226. First cam ring 220 is also fixed axially and is located against a backing plate 228 via a shim ring 230 and a snap ring 232. Backing plate 228 is splined for rotation with front output shaft 42 such that a radial thrust bearing unit 234 is disposed between first cam ring 220 and backing plate 228. First cam ring 220 has a plurality of circumferentially-aligned first cam tracks 236 which followers 224 engage. Second cam ring 222 includes a matching plurality of second cam tracks 240 against which followers 224 also rollingly engage. A pair of cage plates 238 retain and align followers 224 relative to first cam tracks 236 and second cam tracks 240. Second cam ring 222 is adapted to move axially relative to first cam ring 220 as a result of rotation of second cam ring 222 relative to first cam ring 220. As such, the profile and/or contour of cam tracks 236 and 240 controls the linear motion of second cam ring 222. An electric motor 250 acts as mode actuator 62B and has a rotary output driving a gear (not shown) that is meshed with geared rack segment 252 of second cam ring 222. As will be understood, the direction and amount of rotation of the electric motor's output controls the direction and amount of rotation of second cam ring 222, which, in turn, controls the direction, and amount of axial travel of second cam ring 222 relative to the clutch pack. A thrust bearing assembly 254 is disposed between a face surface of second cam ring 222 and a face surface of apply plate 202 to accommodate rotation of apply plate 202 relative to second cam ring 222 during coordinated axial movement of apply plate 202 with second cam ring 222. Those skilled in the art will appreciate that the alternative ballramp unit where one or both cam rings are rotatable to establish axial movement of one of the cam rings is within the scope of the ballramp unit disclosed herein. Additionally, other rotary-to-linear conversion devices (i.e., ballscrew units), camming devices or pivotable devices configured to control the magnitude of the clutch engagement force applied to clutch pack 193 are considered alternatives for mode shift mechanism 82.

Second cam ring 222 is configured to control axial movement of apply plate 202 between a first or minimum clutch engagement position and a second or maximum clutch engagement position relative to clutch pack 193 of friction clutch assembly 189. With apply plate 202 axially located in its first position, a predetermined minimum clutch engagement force is exerted by drive lugs 206 on clutch pack 193, thereby transferring a minimum amount of drive torque from rear output shaft 28 (through transfer mechanism 78) to front output shaft 42. Typically, no drive torque is transmitted from rear output shaft 28 and transfer mechanism 74 through friction clutch assembly 189 when apply plate 202 is located in its first position, thereby establishing a "released" mode for friction clutch assembly 189 and a two-wheel drive mode (2WD) for transfer case 14. In contrast, with apply plate 202 axially located in its second position, a predetermined maximum clutch engagement force is exerted by drive lugs 206 on clutch pack 193, thereby transferring a maximum amount of drive torque through friction clutch assembly 189 to front output shaft 42. In this position, a "fully engaged" mode is established for friction clutch assembly 189 and a locked four-wheel drive mode (LOCK-4WD) is established for transfer case 14. Precise control over the axial location of apply plate 202 between its first and second positions permits adaptive torque transfer from rear output shaft 28 to front output shaft 42 so as to establish an on-demand four-wheel drive (AUTO-4WD) mode for transfer case 14. Return springs 204 react between spring retainer ring 200 and apply plate 202 so as to normally bias apply plate 202 toward its first position. Those skilled in the art will recognize that mode shift mechanism 82 can be any suitable power-operated arrangement operable for controlling movement of apply plate 202 relative to clutch pack 193. While not shown, a power-off brake can be associated with motor 250 which functions to mechanically hold apply plate 202 in its second position to establish the LOCK-4WD mode and allow motor 250 to be turned off when one of the LOCK-4WD modes is selected.

Coordinated actuation of range shift mechanism 72 (via range actuator 62A) and mode shift mechanism 82 (via mode actuator 62B) permits transfer case 14 to establish a plurality of distinct drive modes. As noted, these drive modes may include the 2H drive mode, the LOCK-4H drive mode, the AUTO-4H drive mode, the Neutral mode, the LOCK-4L drive mode and the AUTO-4L drive mode. These available drive modes are established by ECU 56 controlling range actuator 62A and mode actuator 62B in response to the mode signal from mode selector 60 and the sensor signals detected by vehicle sensors 58.

First lubrication mechanism 84 is shown, in this non-limiting example, to include a lube pump 270 having a pump housing 272 non-rotatably fixed to housing assembly 70, and a pump assembly 274 disposed in a pump chamber formed within housing 272. Pump assembly 274 has a rotary pump member fixed for rotation with rear output shaft 28 and which is operable for drawing lubricant from sump area 90 (through a supply tube 276) into a suction-side inlet portion of the pump chamber formed in pump housing 272. Rotation of the rotary pump member caused by rotation of rear output shaft 28 causes the lubricant to be pressurized and discharged from a pressure-side discharge portion of the pump chamber for delivery to a central lube channel 278 formed in rear output shaft 28 via one or more radial feed ports 280. Thereafter, the lubricant in control lube channel 278 is radially dispersed via radial discharge ports to provide lubricant to the various rotary components aligned with the "A" axis. In one embodiment, lube pump 270 could be a gerotor pump.

Second lubrication mechanism 86 is shown, in this non-limiting embodiment, to be configured to catch lubricant splashed from clutch drum 190, second sprocket 172 and chain 174 and to transfer the captured lubricant for use in lubricating and cooling components associated with mode mechanism 80 and other rotary components aligned with the "B" axis. In general, second lubrication mechanism 86 is a "splash recovery" lubrication system that is operable for use in power transfer units having a multi-plate friction clutch assembly disposed, at least partially, for rotation in a lubricant sump, such as sump area 90. The splash recovery clutch lubrication system associated with the various transfer cases of the present disclosure is applicable to other power transfer units of the type used in vehicular drivetrain applications to provide a "pumpless" solution to lubricating rotary components aligned for rotation along a rotary axis positioned in proximity to a lubrication sump. The splash recovery clutch lubrication system provides a means for supplying lubricant to a control portion of a rotating clutch located in the lubricant sump. The present disclosure also eliminates pump priming concerns at low RPM since as the rotational speed increases, the lubricant splashes and reduces the sump height. However, the recovery system feeds lubricant back into the clutch system without concerns related to conventional pump priming. Other resulting advantages include minimized spin losses, weight savings, improved packaging and noise reduction over conventional pump systems.

FIGS. 2 through 3B are directed to an otherwise conventional two-speed version of transfer case 14. As is known, the high-range drive connection between input shaft 72 and rear output shaft 28 establishes a direct (1:1) drive ratio therebetween. Based on the number of gear teeth selected for the geared components of planetary gearset 116, the reduced ratio drive connection established between input shaft 72 and rear output shaft 28 generally is selected in the range of 2.72:1 (standard low-range) and 4.0:1 (Creeper low-range). The availability of only one of these reduced ratio low-range drive connections is not always optimal, especially for 4WD vehicles used in off-road situations. Thus, a need exists to develop transfer cases having a range mechanism capable of providing two distinct low-range drive connections, preferably delineated by reduced ratios ranging between about 1.5:1 to about 5.2:1. More specifically, a first low-range drive connection established at a reduced ratio of about 1.5:1 to 2.2:1 provides a first off-road mode best suited for higher vehicle speeds while driving on trails or sand in comparison to the standard low-range ratio (2.72:1). Likewise, a second low-range drive connection established at a reduced ratio of about 5.2:1 provides a second off-road mode best suited for lower speed and higher torque (i.e., rock crawling) driving conditions in comparison to the standard creeper low-range ratio (4.0:1).

Figure 4:
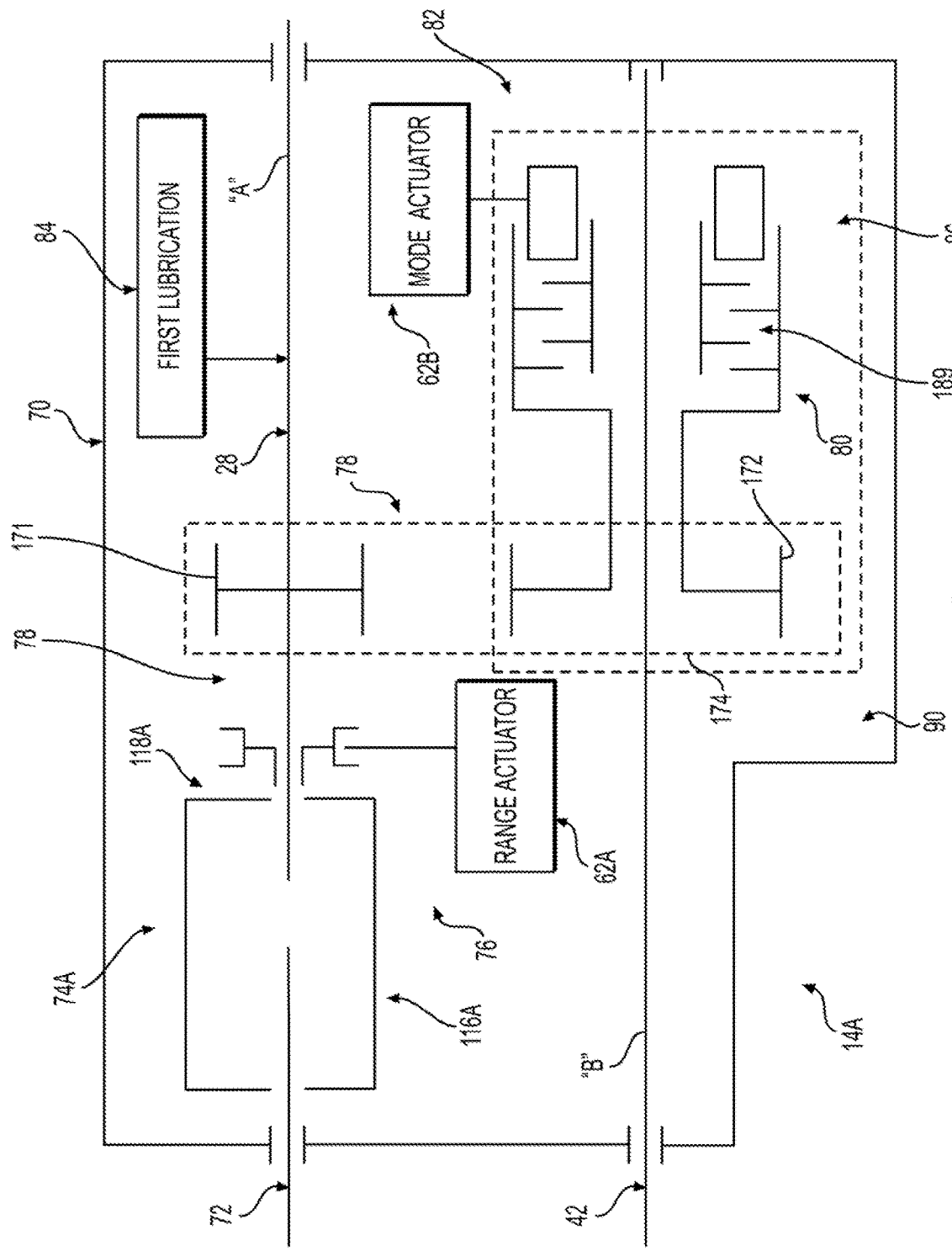
FIG. 4 is a diagrammatical illustration of a three-speed transfer case constructed in accordance with the teachings of the present disclosure.

In view of this recognized need, the present disclosure is directed to transfer cases having a three-speed range mechanism configured to include a planetary-type reduction gearset and a range clutch that are interactively associated to permit selective establishment of a direct ratio (high-range) drive connection, a first reduced ratio (ow-range) drive connection, and a second reduced ratio (crawler-range) drive connection. To this end, FIG. 4 is generally a modified version of FIG. 2 illustrating a three-speed transfer case 14A having many common components (identified via common reference numerals) in addition to a range mechanism 74A now configured to include a planetary-type reduction gearset 116A and a range clutch 118A controlled by range actuator 62A to selectively establish the three (3) distinct range drive connections between input shaft 72 and rear output shaft 28.

Figure 5:
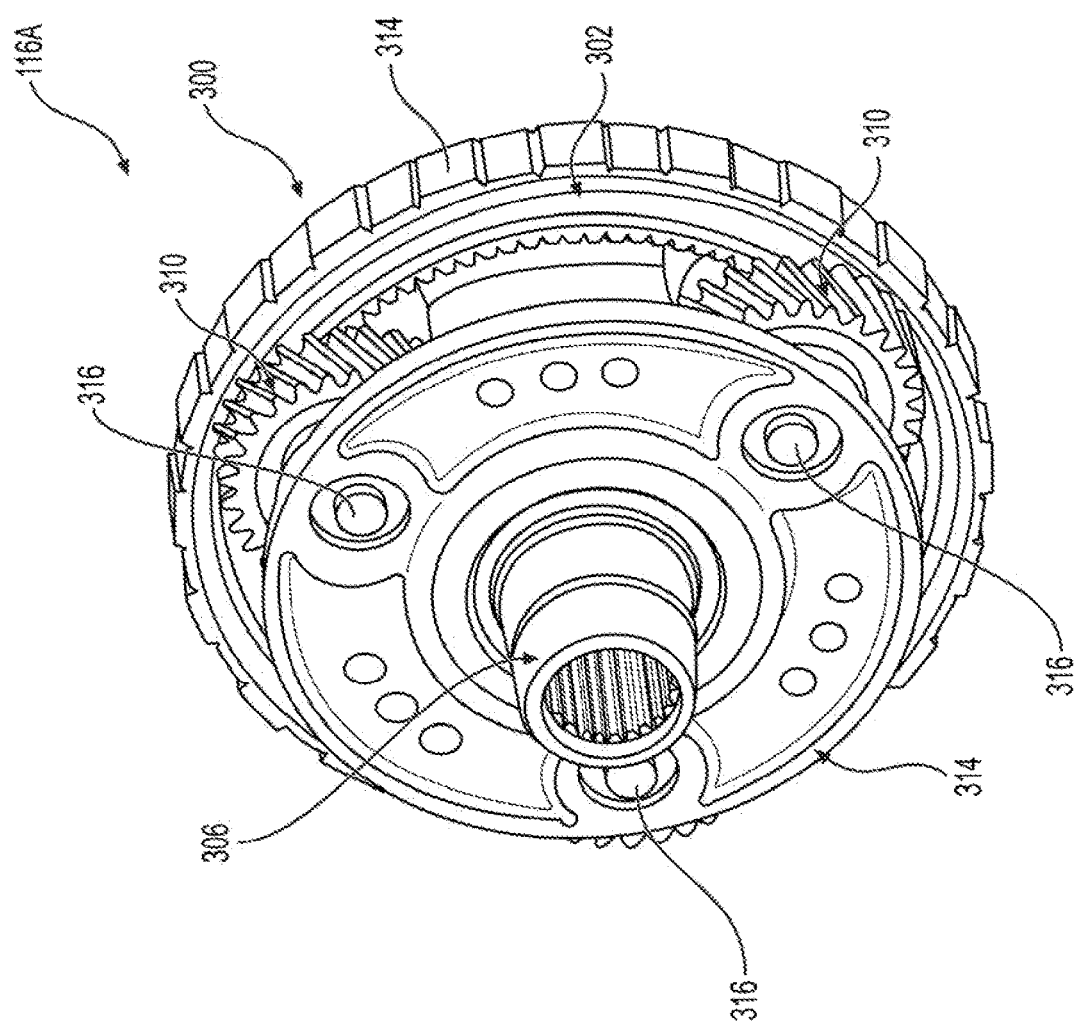
FIG. 5 is an assembled isometric view of the planetary-type reduction gearset shown in FIG. 4 as part of the three-speed transfer case.
Figure 6:
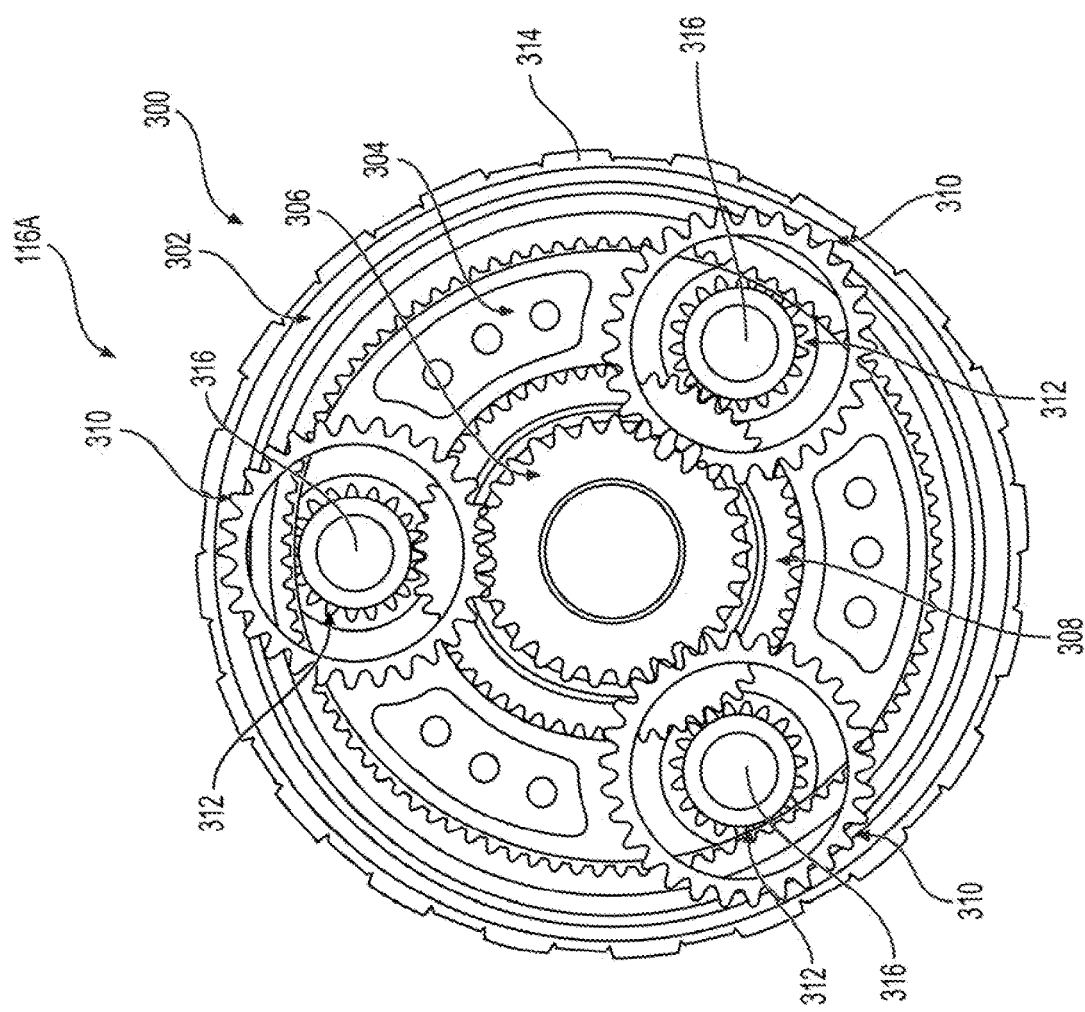
FIG. 6 is a sectional view of the planetary-type reduction gearset shown in FIG. 5 including the formulaic gear calculations used for establishing each of the three speed ranges provided by the three-speed transfer case of the present disclosure.

With initial attention directed to FIGS. 5 and 6, planetary-type reduction gearset 116A is shown as a dual sun/dual planet gearset 300 generally configured to include a ring gear 302, a planet carrier unit 304, a first sun gear 306, a second sun gear 308, and a plurality of first planet gears 310 and second planet gears 312. Ring gear 302 is adapted to be non-rotatably fixed to transfer case housing 70, such as via radial coupling lugs 314. In addition, a plurality of pinion shafts 316 are equally-spaced and rotatably supported from planet carrier unit 304. Each pinion shaft 316 has corresponding first planet gear 310 and second planet gear 312 fixed thereto for common rotation relative to planet carrier unit 304. Each first planet gear 310 is in constant meshed engagement with first sun gear 306. Likewise, each second planet gear 312 is in constant meshed engagement with both ring gear 302 and second sun gear 308.

In some embodiments, a driving connection with the first sun gear establishes a high-range drive modes at a ratio (1:1), a driving connection establishes a first reduced ratio defined by (a second sun gear 308 ratio+a ring gear 302 ratio)/a second sun gear 308 ratio, and a driving connection establishes a second reduced ratio defined by 1+(the ring gear ratio 302/the second sun gear 308 ratio)×(a first planet gear 310 ratio/a sun gear 306 ratio).

Figure 7:
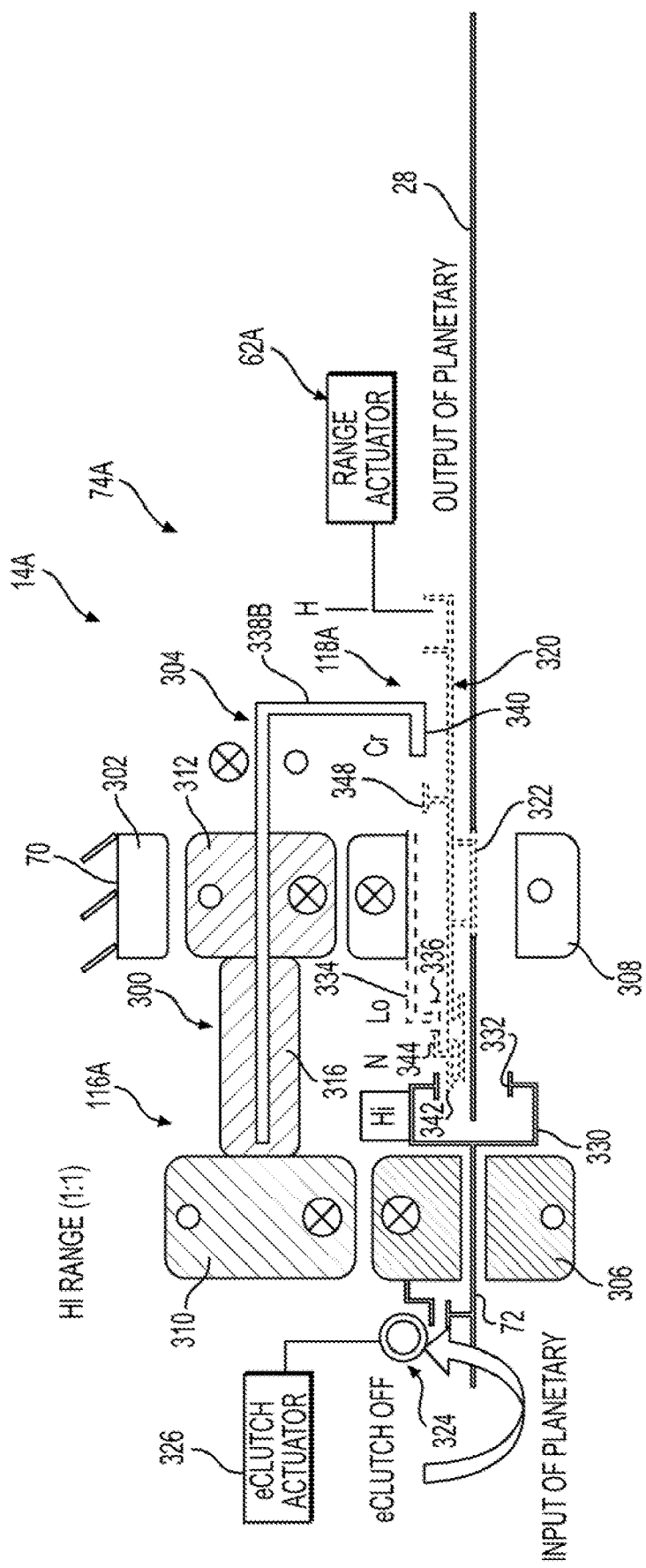
FIG. 7 is a diagrammatical illustration of the three-speed transfer case constructed in accordance with a first non-limiting embodiment and illustrating the range clutch interacting with the planetary-type reduction gearset to establish a first ratio drive connection between the input shaft and the rear output shaft, hereinafter referred to as the direct ratio (1:1) or high-range drive connection.
Figure 8:
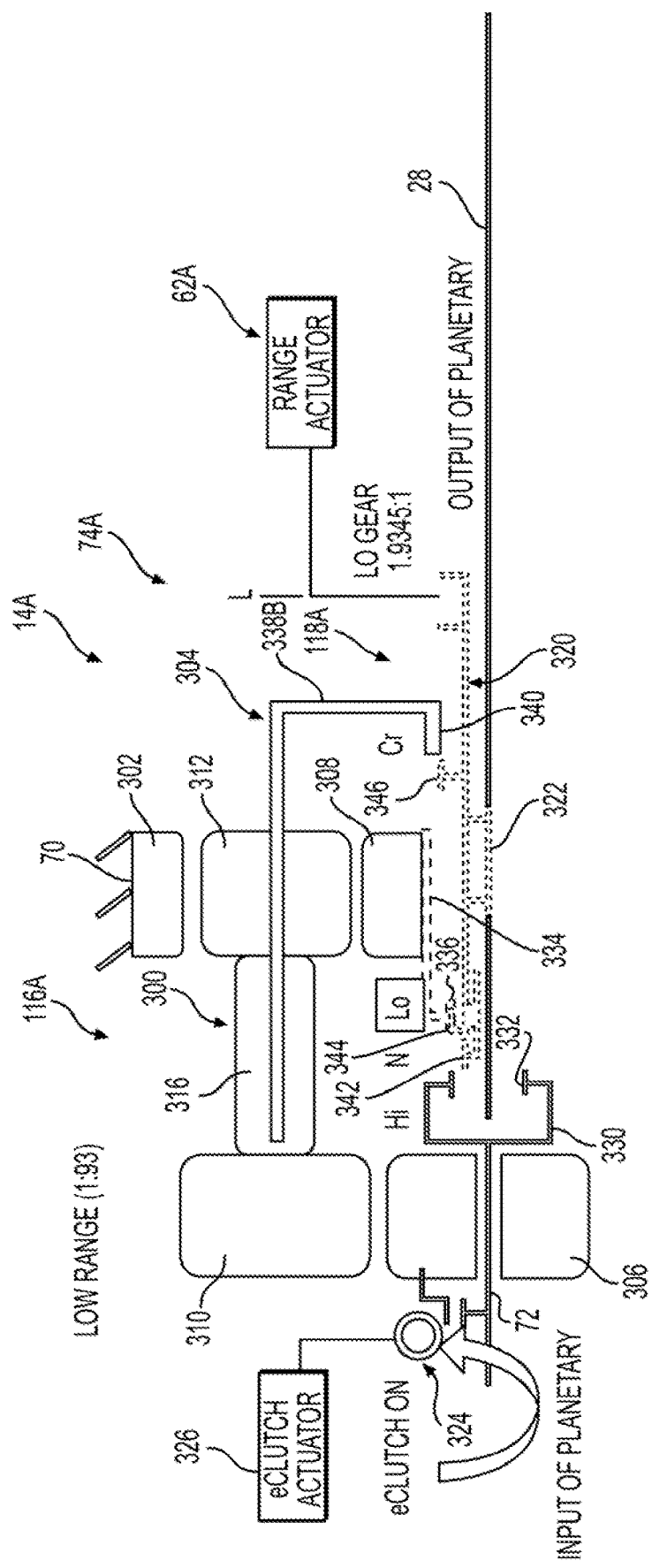
FIG. 8 is similar to FIG. 7 but now shows the range clutch interacting with the planetary-type reduction gearset to establish a second ratio drive connection between the input shaft and the rear output shaft, hereinafter referred to as the low ratio (about 1.9345:1) or low-range drive connection.
Figure 9:
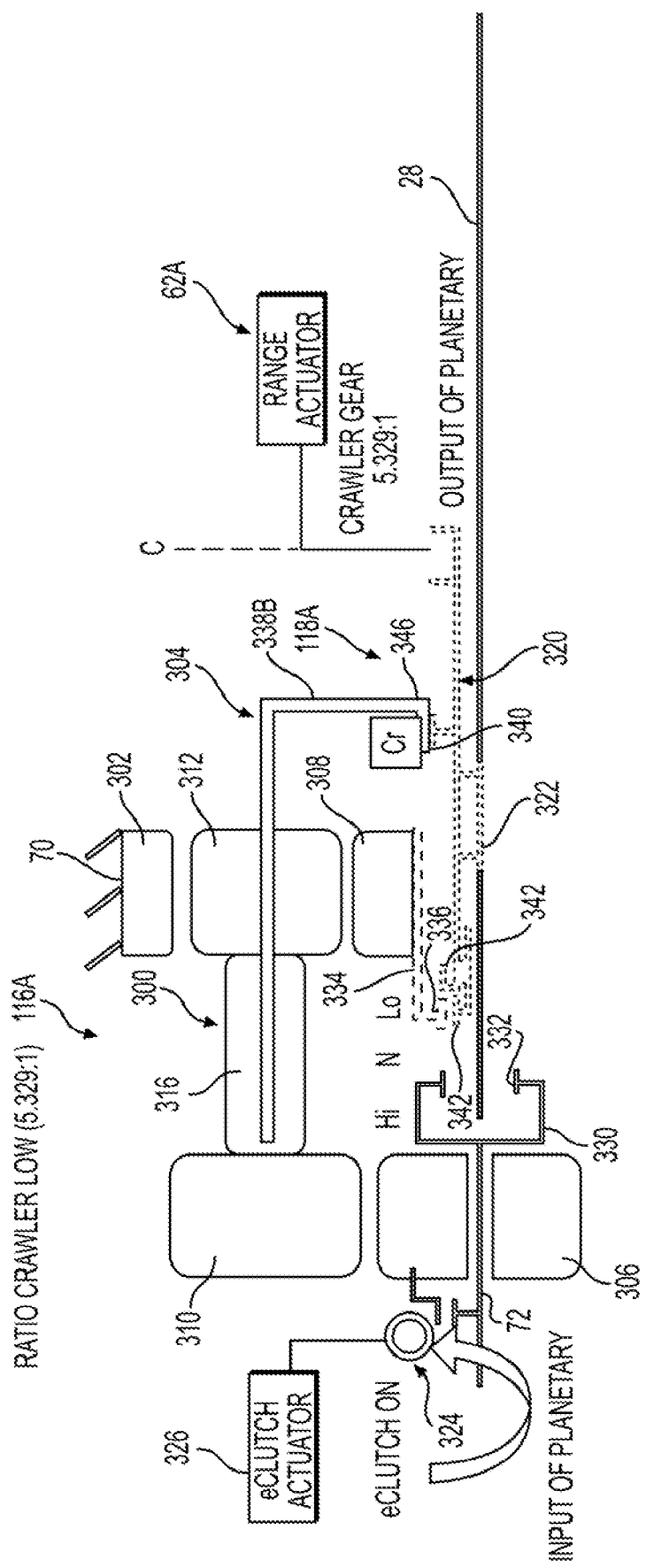
FIG. 9 is also similar to FIGS. 7 and 8 but now shows the range clutch interacting with the planetary-type reduction gearset to establish a third ratio drive connection between the input shaft and the rear output shaft, hereinafter referred to as the crawler ratio (about 5.329:1) or crawler-range drive connection.

FIGS. 7-9 show portions of three-speed transfer case 14A to better illustrate the orientation of dual sun/dual planet gearset 300 operably disposed between input shaft 72 and rear output shaft 28. The dual sun/dual planet gearset 300 may be provided in each embodiment described herein. In addition, range clutch 118A is shown to include a range collar 320 coupled via a splined connection 322 to rear output shaft 28 such that range collar 320 is fixed for rotation with rear output shaft 28 but axially-moveable thereon between a series of distinct range positions. Range actuator 62A is again shown for controlling axial movement of range collar 320 between its distinct range positions. Transfer case 14A is also shown to include an electrically-controlled clutch (eClutch) unit 324 controlled by an eClutch actuator 326 in response to control signals from ECU 56. In accordance with this non-limiting embodiment, eClutch unit 324 is operable in a first or "disconnect" state to disconnect first sun gear 306 from driven engagement with input shaft 72. As seen, first sun gear 306 is shown to be rotatable supported on input shaft 72. In a second or "connect" state, eClutch unit 324 functions to connect first sun gear 306 for rotation with input shaft 72. Actuator 326 functions to shift eClutch unit 324 between its first and second operative states. As will be appreciated, eClutch unit 324 and actuator 326 can be any suitable power-operated two-state clutch arrangement capable of electively controlling coupling and uncoupling of first sun gear 306 relative to input shaft 72.

With continued attention to FIGS. 7-9, input shaft 72 is shown to include an extension segment 330 having a continuous series of radially-extending internal first clutch teeth 332. Likewise, second sun gear 308 is shown to include a hub segment 334 having a continuous series of radially-extending internal second clutch teeth 336. Additionally, an end plate segment 338 of planet carrier unit 304 is shown to include a continuous series of radially-extending internal third clutch teeth 340. Range collar 320 is shown to include several continuous series of radially-extending external teeth arranged to define first range teeth 342, second range teeth 344 and third range teeth 346.

FIG. 7 illustrates range mechanism 116A establishing the high-range drive connection between input shaft 72 and rear output shaft 28 with eClutch unit 324 operating in its first state and range collar 320 axially located in a first (H) range position. As such, first sun gear 306 is disconnected from input shaft 72 so as to shift planetary gearset 300 into a non-driven state to limit losses and improve full economy. With range collar 320 located in its high-range (H) position, its first range teeth 342 are in meshed engagement with first clutch teeth 332 on input shaft 72. At the same time, its second range teeth 346 are displaced from meshed engagement with second clutch teeth 336 on second sun gear 308 and its third range teeth 346 are displace from meshed engagement with third clutch teeth 340 on planet carrier unit 304. Accordingly, a direct drive connection is established between input shaft 72 and rear output shaft 28, whereby transfer case 14A is operating in one of its high-range drive modes at a ratio (1:1) between input shaft 72 and rear output shaft 28.

FIG. 8 illustrates range mechanism 116A establishing the low-range drive connection between input shaft 72 and rear output shaft 28 with eClutch unit 324 operating in its second/connected state and range collar 320 located in a second (L) range position. As such, input shaft 72 drives first sun gear 306, which, in turn, causes second sun gear 308 to be driven via gearset 300 at the first reduced ratio relative to input shaft 72. Note that with range collar 320 moved out of its H range position and into its L range position, first range teeth 342 are disconnected from first clutch teeth 332 while third range teeth 346 remained disengaged from third clutch teeth 340. However, second range teeth 344 on range collar 320 are now in meshed engagement with second clutch teeth 336, whereby range collar 320 couples second sun gear 308 to rear output shaft 28. Accordingly, a low-range drive connection at the first reduced ratio (1.93:1) is established between input shaft 72 and rear output shaft 28, whereby transfer case 14A is operating in its four-wheel low-range (4WL) drive mode. While not specifically shown, movement of range collar 320 from its H range position into it L range position causes range collar 320 to move through a first non-driven or neutral (N1) position whereat range collar 320 is disconnected from input shaft 72 and planetary gearset 300.

FIG. 9 illustrates range mechanism 116A establishing the crawler-range drive connection between input shaft 72 and rear output shaft 28 with eClutch unit 324 maintained in its second/connected state and range collar 320 now located axially in a third or "crawler" (C) range position. As such, input shaft 72 continues to drive first sun gear 306 which, in turn, causes gearset 300 to drive planet carrier unit 304 at the second reduced ratio (about 5.329:1) relative to input shaft 72. With range collar 320 in its C range position, its first and second range teeth are disconnected from the first and second clutch teeth, respectively, while its third range teeth 346 are in meshed engagement with third clutch teeth 340 on carrier plate 338 of planet carrier unit 304. As such, range collar 320 couples planet carrier unit 304 to rear output shaft 28. Accordingly, a crawler-range drive connection at the second reduced ratio is established between input shaft 72 and rear output shaft 28, whereby transfer case 14A is operating in its four-wheel crawler-range drive mode. It should be noted that, while to specifically shown in the stick diagrams of FIGS. 7-9, range collar 320 moves into its first neutral (N1) position (between the H and L positions) and into a second non-driven or neutral (N2) position (between the L and C positions) in which range collar 320 is disconnected from gearset 300.

Figure 10:
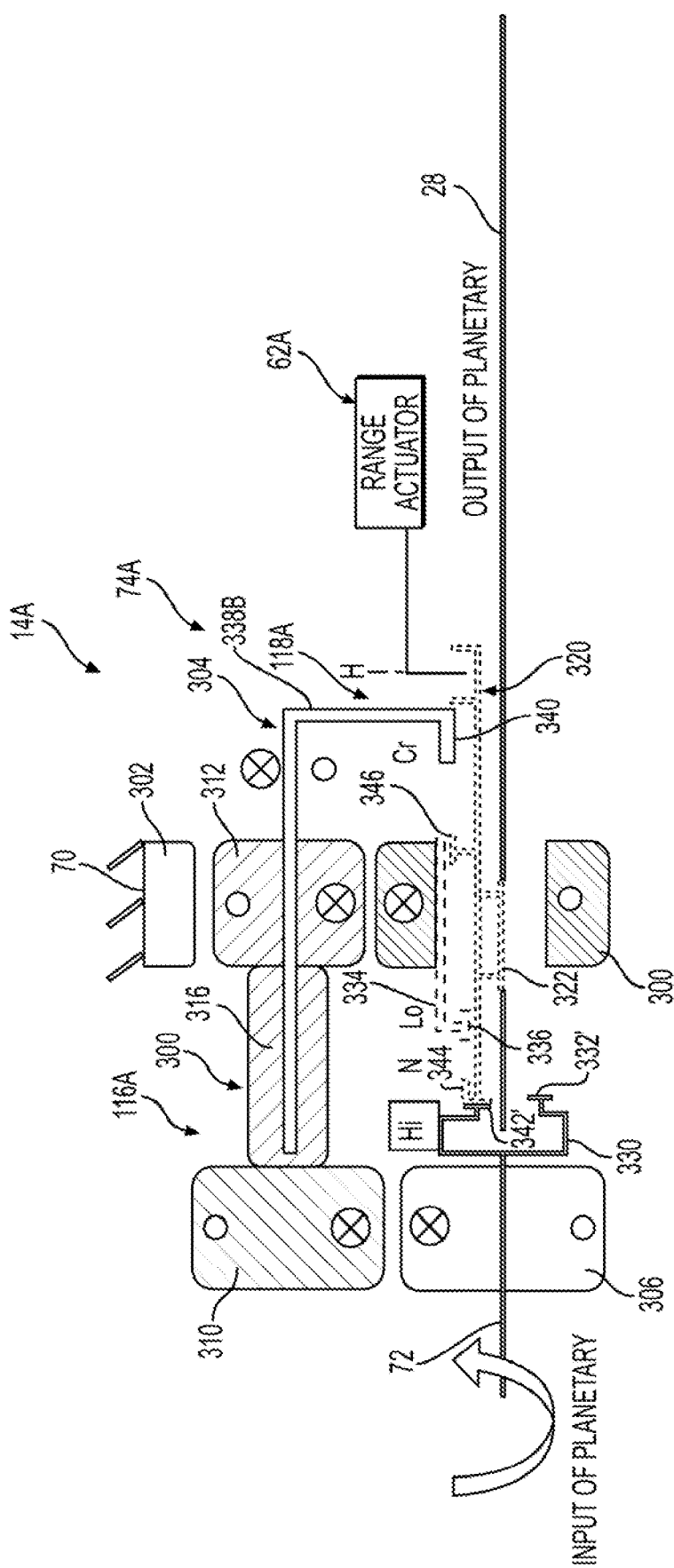
FIG. 10 is a diagrammatical illustration of the three-speed transfer cased constructed in accordance with a second non-limiting embodiment and illustrating the range clutch interacting with the planetary-type reduction gearset to establish the high-range drive connection.
Figure 11:
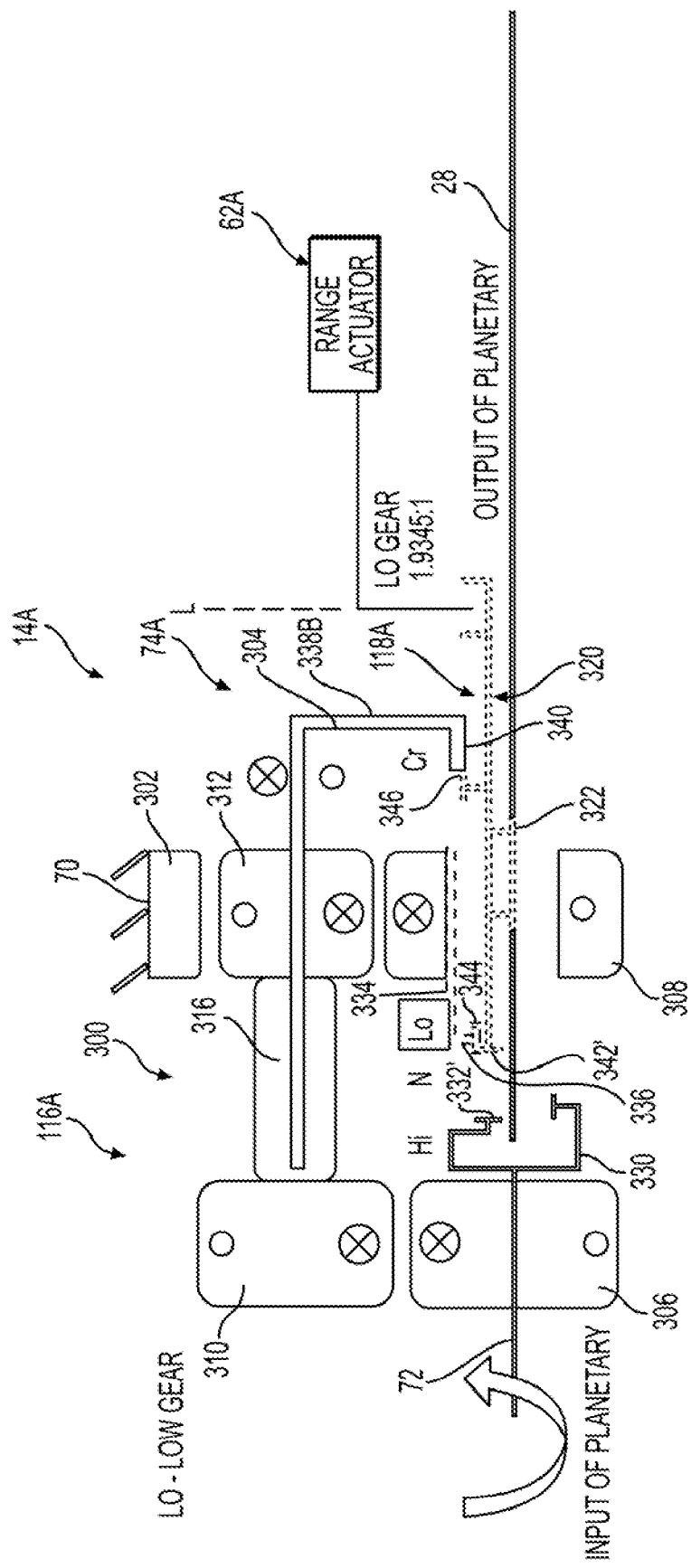
FIG. 11 is similar to FIG. 10 but now illustrates the range clutch interacting with the planetary-type reduction gearset to establish the low-range drive connection.
Figure 12:
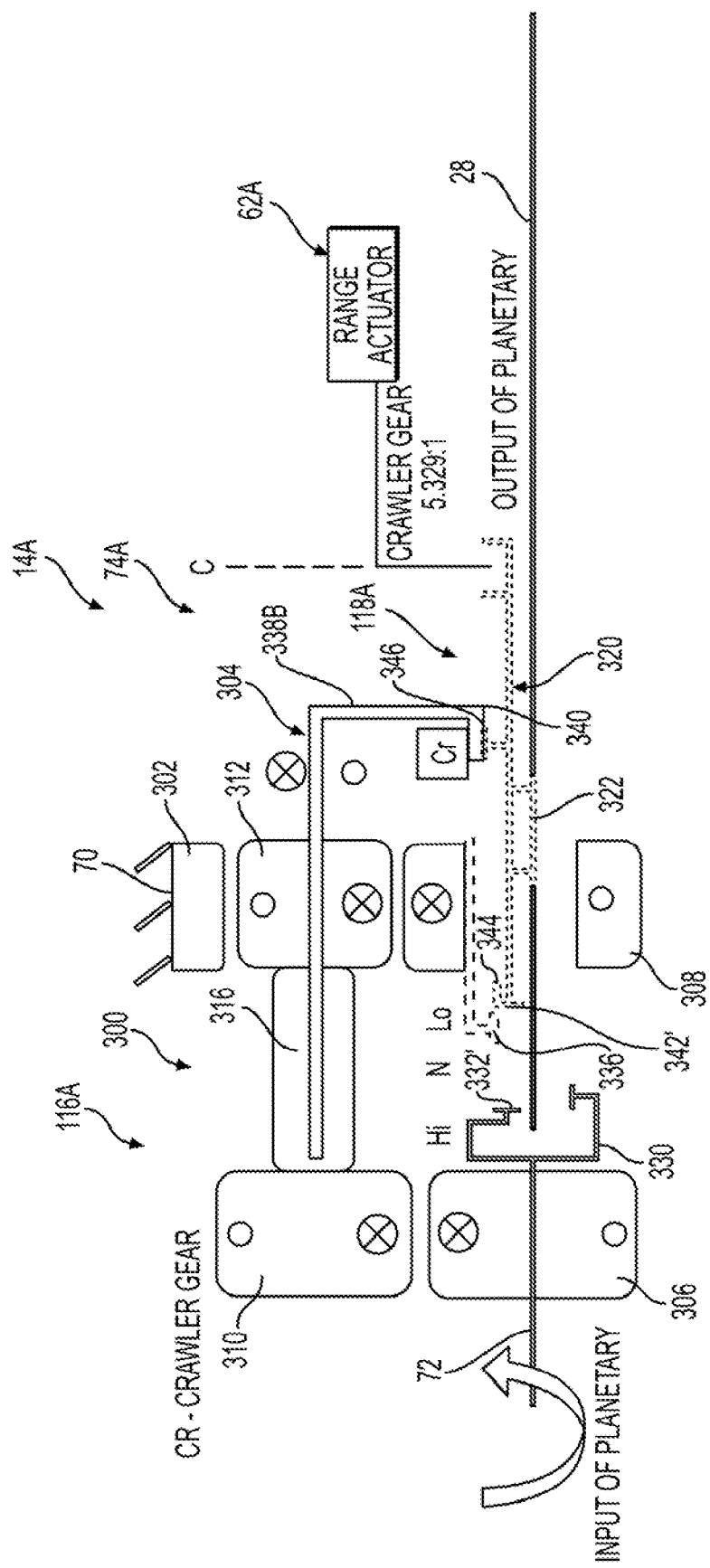
FIG. 12 is similar to FIGS. 10 and 11 but now shows the range clutch interacting with the planetary-type reduction gearset to establish the crawler-range drive connection.

Referring now to FIGS. 10-12, a portion of three-speed transfer case 14A is shown equipped with a slightly modified version of planetary-type reduction gearset 116A and range clutch 118A in comparison to the arrangement shown and described relative to FIGS. 7-9. In particular, eClutch unit 324 and eClutch actuator 326 have been eliminated with first sun gear 306 of dual sun/dual planet gearset 300 now being directly coupled for common rotation with input shaft 72. Thus, planetary gearset 300 is no longer selectively disconnected from input shaft 72 and is always driven. In addition, radially-directed first clutch teeth 332 on input shaft extension 330 are now configured as axially-directed first clutch lugs 332' while radially-directed first range teeth 342 on range collar 320 are now configured as axially-directed first range lugs 342'. This modified arrangement establishes a face-type clutch engagement between input shaft 72 and range collar 320 in its first (H) range position. FIG. 10 illustrates range collar 320 located in its first (H) range position to establish the direct ratio (1:1) drive connection. FIG. 11 illustrates range collar 320 located in its second (L) range position for establishing the first reduced ratio (about 1.93:1) drive connection. Finally, FIG. 12 illustrates range collar 320 located in its third (C) range position for establishing the second reduced ratio (about 5.329:1) drive connection. As mentioned previously, range collar 320 moves from its H range position into its first N1 position prior to movement into its L range position and subsequently moves into a second N2 position upon movement of range collar from its L range position towards its C range position.

Referring now to FIGS. 13-17, a series of partial sectional views of transfer case 14A sequentially illustrate shifting of range mechanism 74A between five (5) distinct range positions. The arrangement shown in FIGS. 13-17 is a slightly modified version of that shown in FIGS. 10-12. In particular, a slightly modified version of range collar 320 is used to provide the three (3) driving positions and the two (2) non-driving positions. In addition, these drawings provide more details of the arrangement including the use of bearing unit 400 to rotatably support input shaft 72 from housing 70, bearing units 402 and 404 for rotatably supporting pinion posts 316 from carrier plates 338A and 338B of carrier unit 304, bearing unit 406 to rotatably support second sun gear 308 from first sun gear 306, bearing unit 408 disposed between first sun gear 306 and rear output shaft 28, bearing unit 410 facilitating relative rotation between second sun gear 308 and carrier plate 338B, and bearing unit 412 supporting first carrier plate 338A for rotation relative to input shaft 72.

Figure 13:
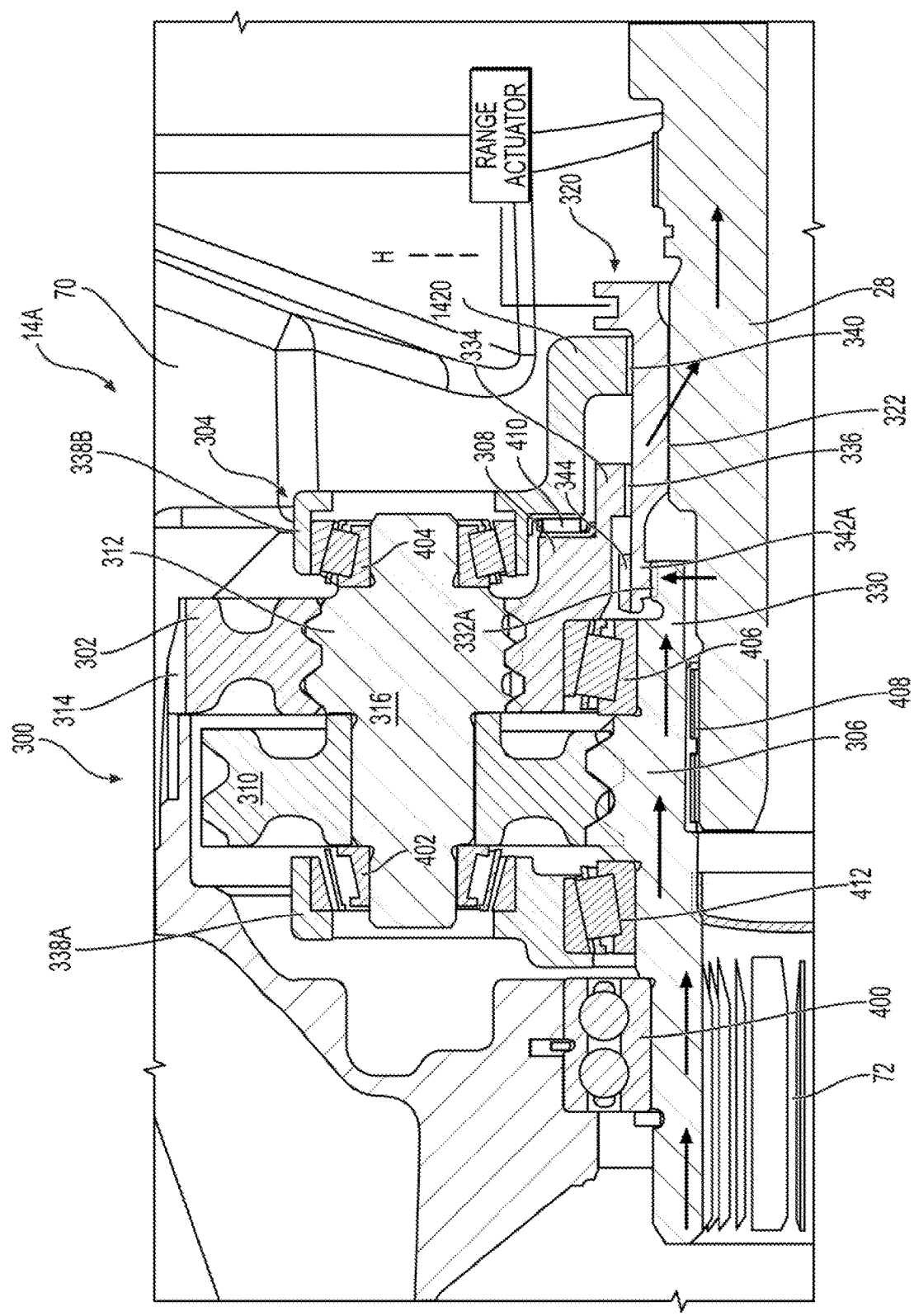
FIG. 13 is a sectional view of the three-speed transfer case constructed in accordance with a third non-limiting embodiment and illustrating the range clutch interacting with the planetary-type reduction gearset to establish the high-range drive connection.

FIG. 13 illustrates range collar 320 located in its high (H) range position with radially-extending external first clutch teeth 332A formed on extension 330 of first sun gear 306 (or input shaft 72) shown in meshed engagement with radially-extending internal first range teeth 342A on range collar 320. Note that range collar 320 is disengaged from second clutch teeth 336 on second sun gear 308 and third clutch teeth 340 on planet carrier unit 304. Also, note that third clutch teeth 340 are now formed on an annular drum extension 420 formed on carrier plate 338B of planet carrier unit 302. Thus, drive torque is transferred at the direct speed ratio from input shaft 72 to rear output shaft 28 via range collar 320.

Figure 14:
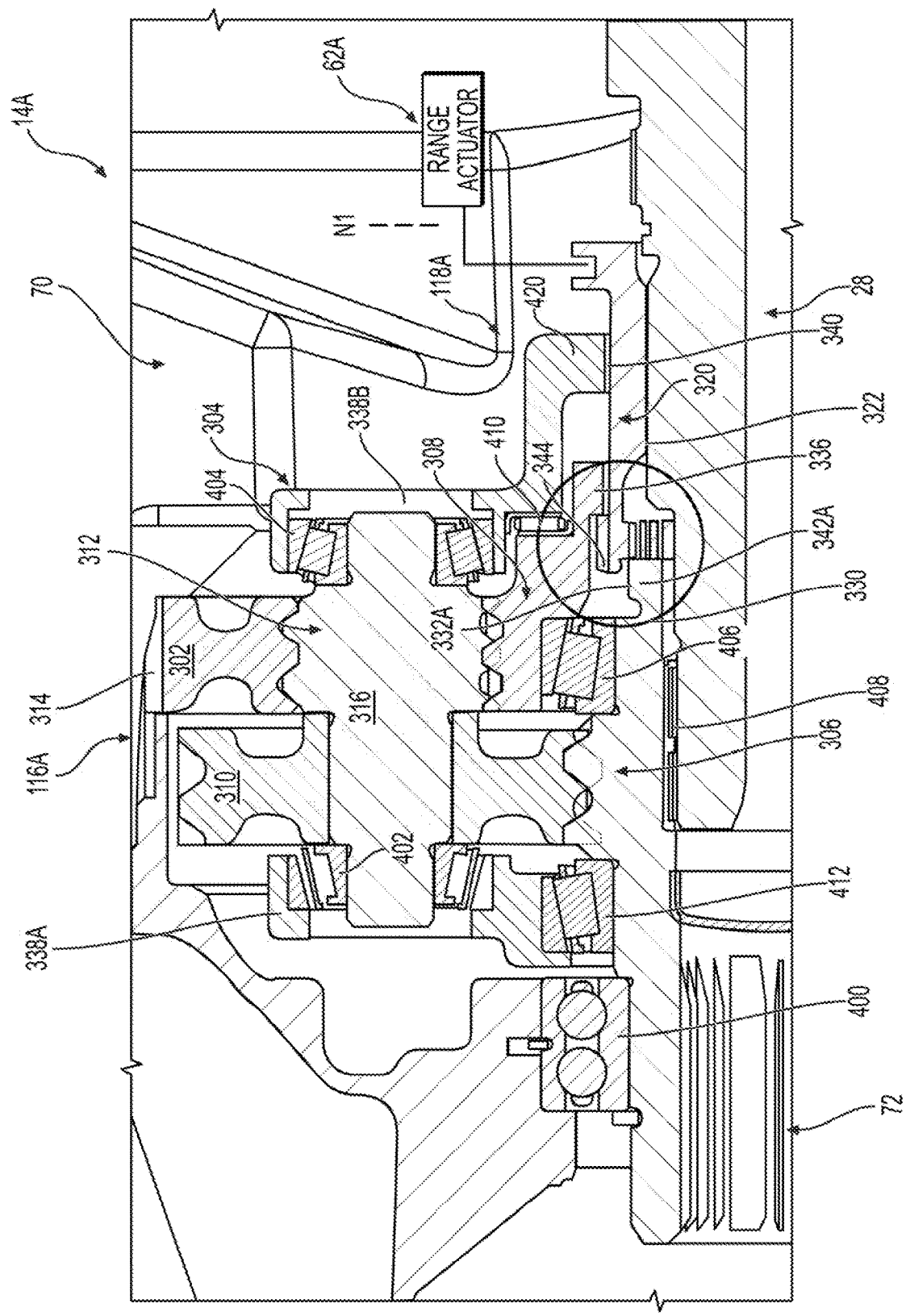
FIG. 14 is similar to FIG. 13 but now shows the range clutch interacting with the planetary-type reduction gearset to establish a first neutral or disconnected state.

FIG. 14 illustrates range collar 320 located in its first neutral (N1) range position. As seen, first range teeth 342A are displaced from engagement with first clutch teeth 332A on stub shaft extension 330 and second range teeth 344 are displaced from engagement with second clutch teeth 336 on second sun gear 308. Thus, drive torque is not transmitted from input shaft 72 to rear output shaft 28.

Figure 15:
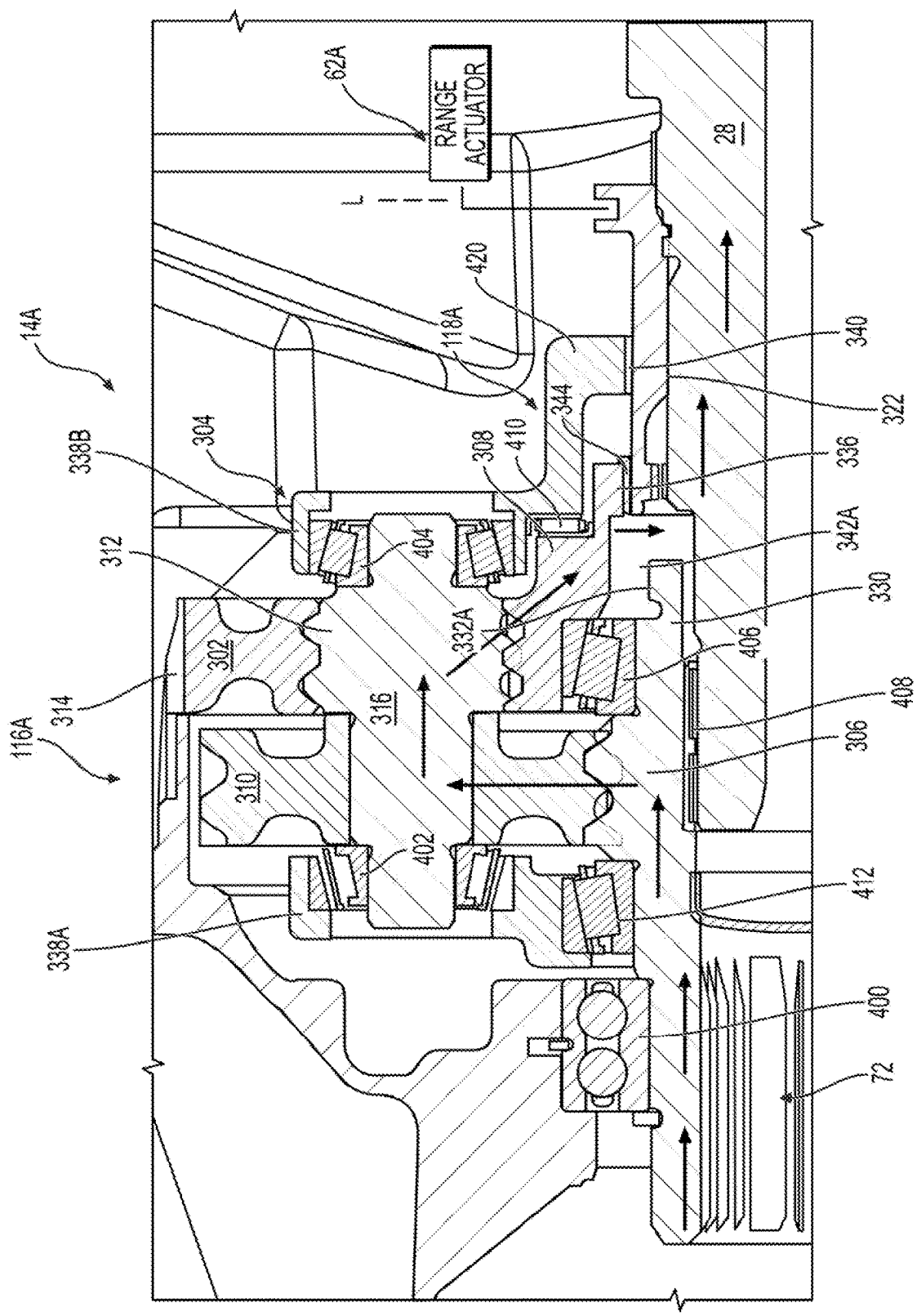
FIG. 15 is similar to FIGS. 13 and 14 but now shows the range clutch interacting with the planetary-type reduction gearset to establish the low-range drive connection.

FIG. 15 illustrates range collar 320 now located in its low (L) range position. In this position, second range teeth 344 on range collar 320 are in meshed engagement with second clutch teeth 336 on second sun gear 308. Thus, drive torque is transmitted from input shaft 72 through first sun gear 306, first planet gears 310, second planet gears 312 and second sun gear 308 to rear output shaft 28 via range collar 320 at the first reduced ratio.

Figure 16:
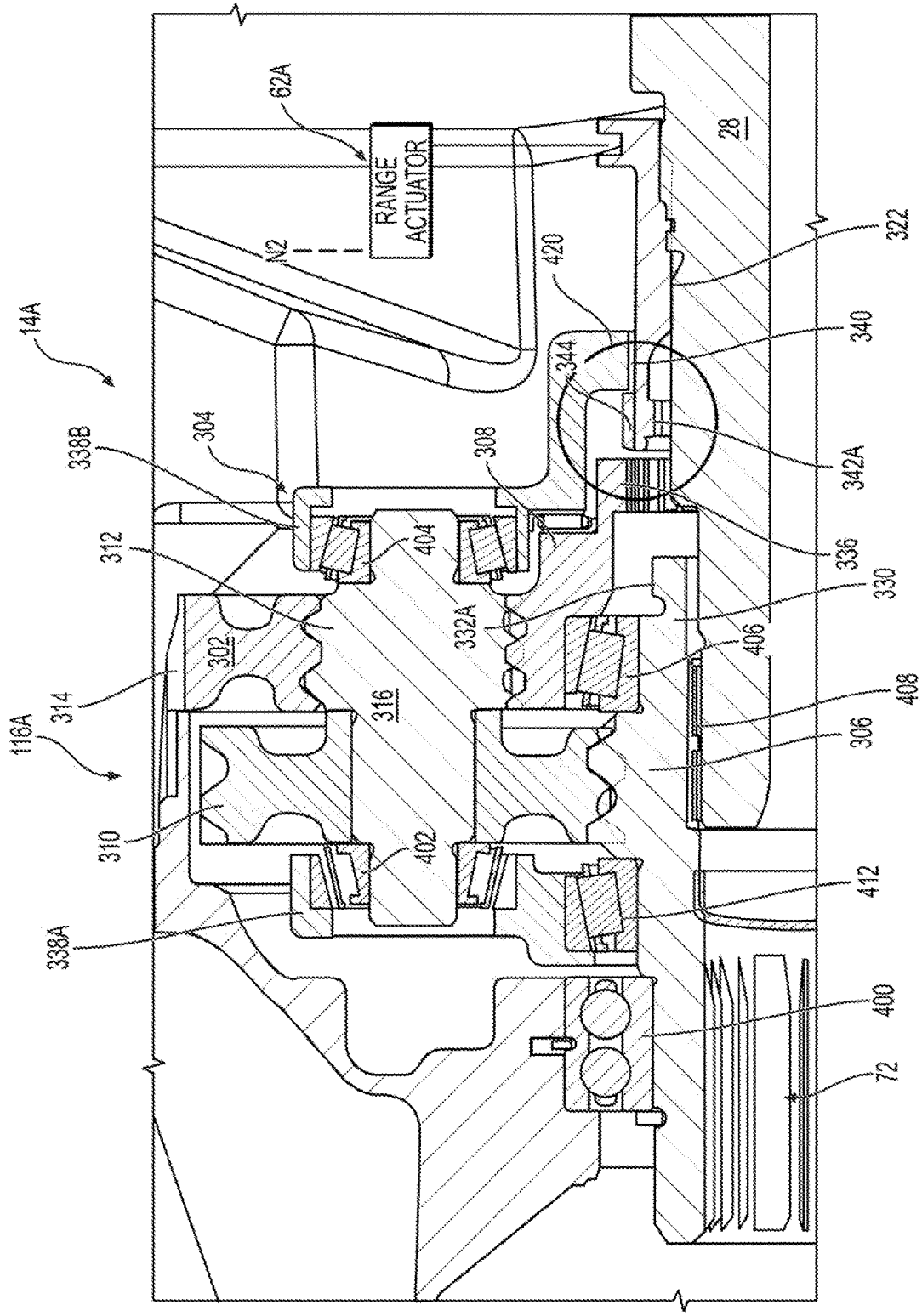
FIG. 16 is similar to FIGS. 13-15 but now shows the range clutch interacting with the planetary-type reduction gearset to establish a second neutral or disconnected state.

FIG. 16 illustrates range collar 320 located in its second neutral (N2) range position. As seen, second range teeth 344 on range collar 320 are disengaged from second clutch teeth 334 on second sun gear 308 and from third clutch teeth 340 on carrier plate 338B. Thus, drive torque is not transmitted from input shaft 72 to rear output shaft 28.

Figure 17:
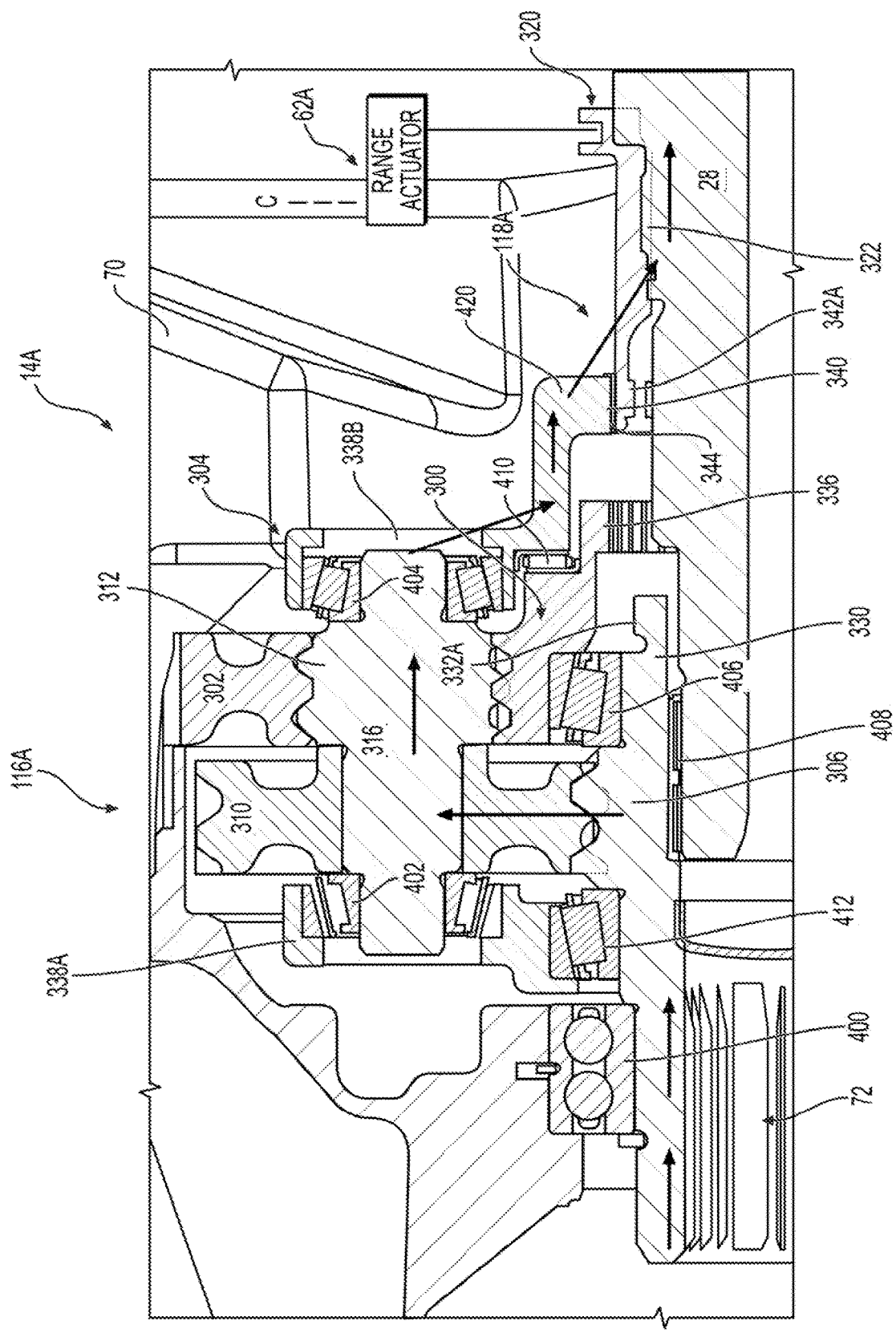
FIG. 17 is similar to FIGS. 13-16 but now shows the range clutch interacting with the planetary-type reduction gearset to establish the crawler-range drive connection.

FIG. 17 illustrates range collar 320 now located in its crawler (C) range position. In this position, second range teeth 344 on range collar 320 are in meshed engagement with third clutch teeth 340 on second carrier plate 338B of planet carrier unit 304. Thus, drive torque is transmitted from input shaft through gearset 300 to rear output shaft 28 via range collar 32o at the second reduced ratio.

Figure 18:
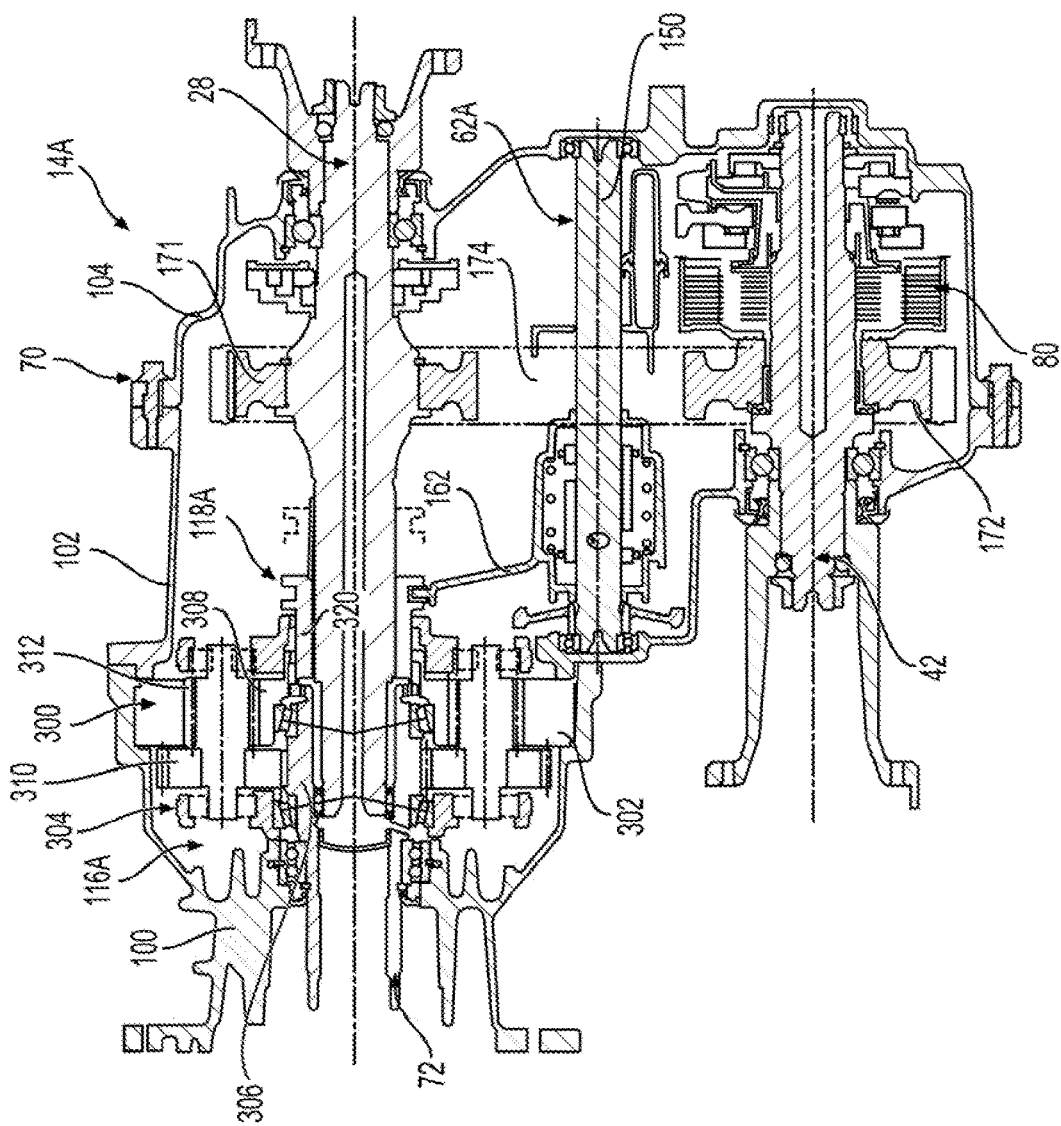
FIG. 18 is a sectional view of the three-speed transfer case associated with FIGS. 13-17 and further illustrating a power-operated range clutch actuation mechanism, a multi-plate mode clutch, and a power-operated mode clutch actuation mechanism.

FIG. 18 is a sectional view of an exemplary version of transfer case 14A equipped with range mechanism 24A shown in FIGS. 15-17. It will be appreciated that the previous versions of the range mechanisms shown in FIGS. 7-9 and FIG. 10-12 can likewise be adapted into a similar arrangement for transfer case 14A. Common components of transfer case 14A are identified with common reference numerals. Thus, transfer case 14A is a three-speed active transfer case capable of providing a plethora of different drive modes including: the two-wheel high-range (2WD drive mode; an adaptive four-wheel high-range (AUTO-4WH) drive mode; a locked four-wheel high-range (LOCK-4WH) drive mode; an adaptive four-wheel low-range (AUTO-4WL) drive mode; a locked four-wheel low-range (LOCK-4WL) drive mode; an adaptive four-wheel crawler-range (AUTO-4WC) drive mode; and a locked four-wheel crawler-range (LOCK-4WC) drive mode. These drive modes are established via coordinated actuation of the three-speed range mechanism 74A and actuation of mode mechanism 80.

Figure 19:
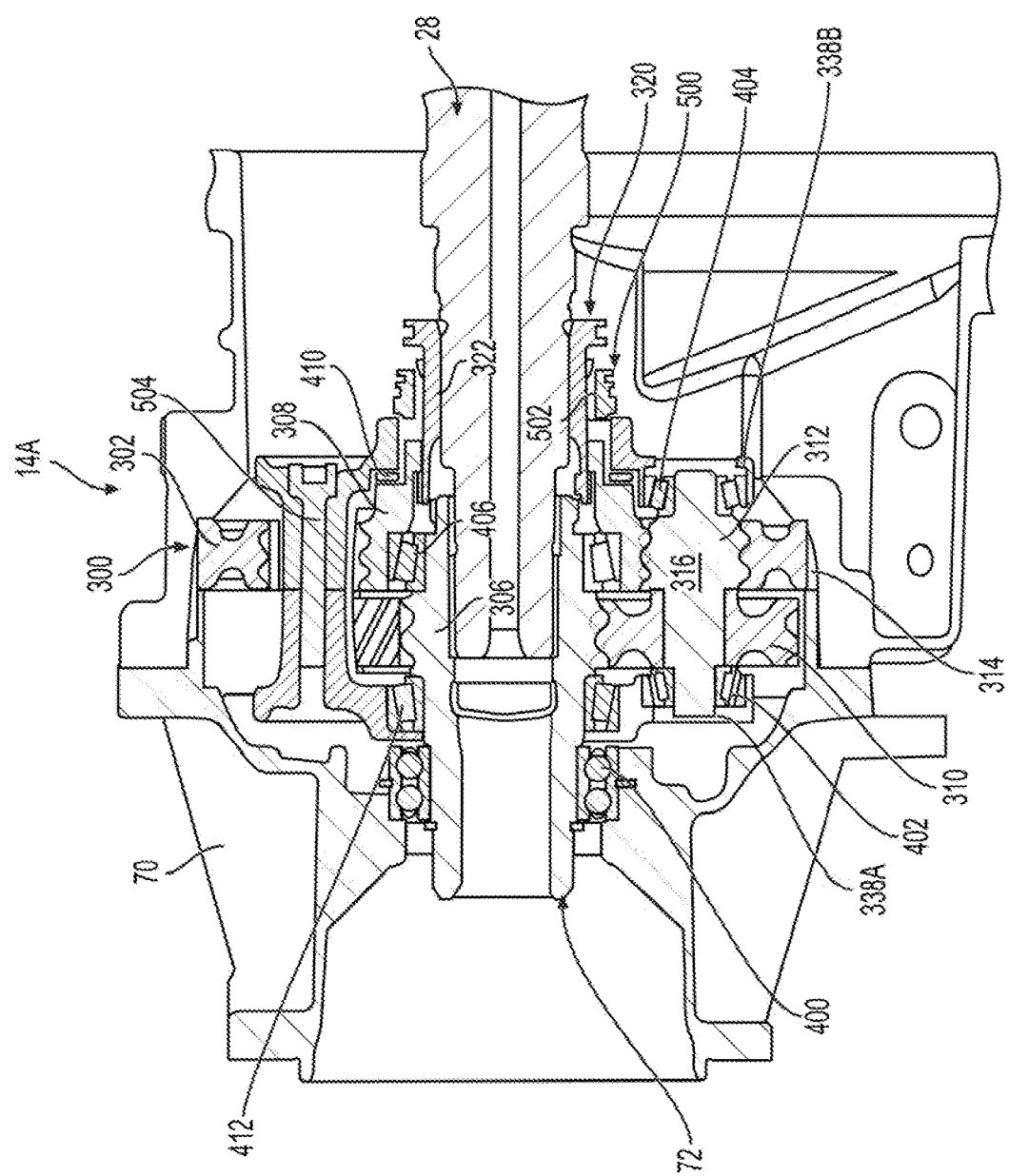
FIG. 19 is a partial sectional view of the three-speed transfer case constructed in accordance with a fourth non-limiting embodiment.
Figure 20:
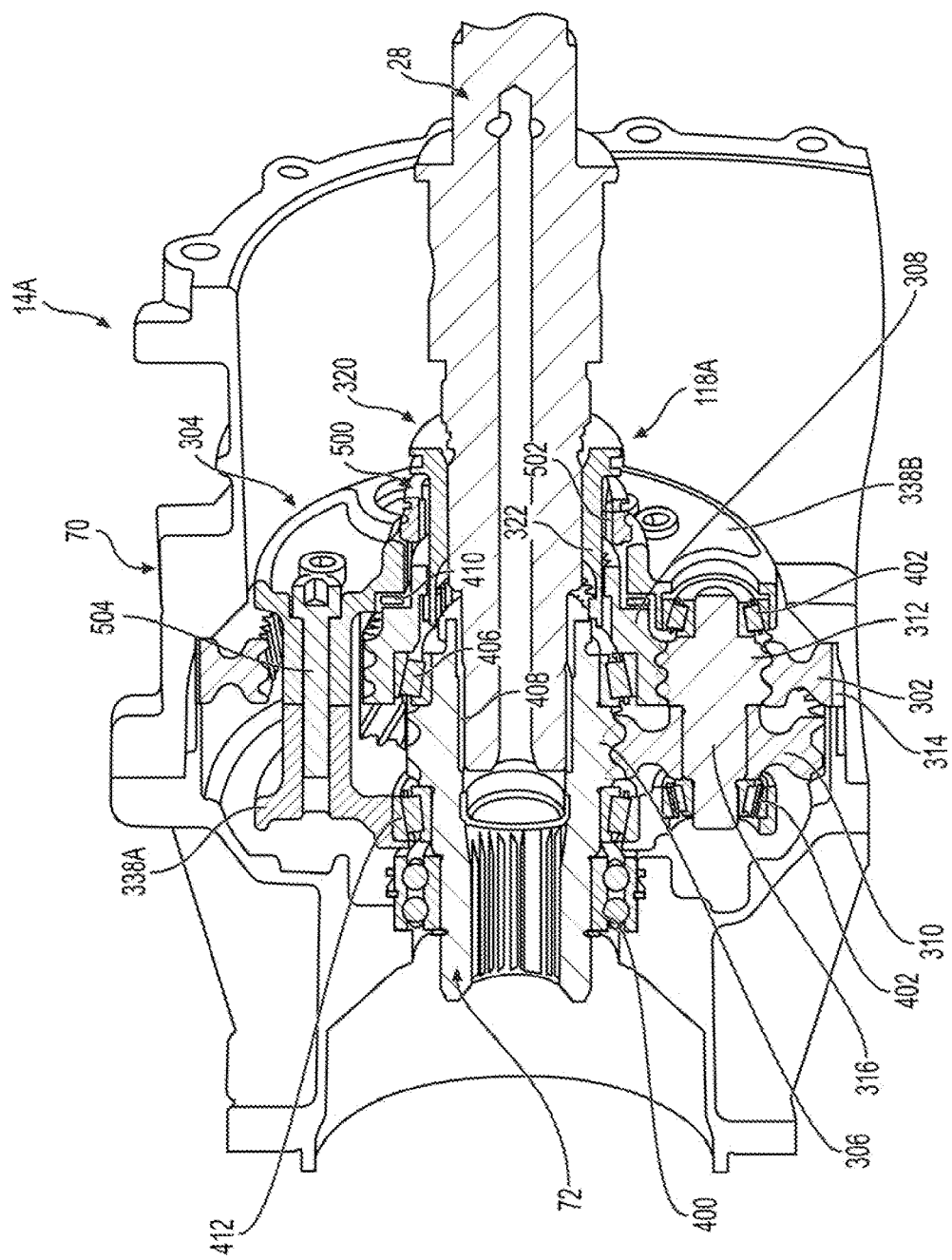
FIG. 20 is a partially-sectioned isometric view of the three-speed transfer case shown in FIG. 19.

With particular reference now to FIGS. 19-25, another non-limiting embodiment of three-speed transfer case 14A is shown which is generally a modified version of the configuration shown in FIGS. 13-17. Accordingly, common reference numbers are used to identify components previously disclosed. The primary distinction between the version shown and described in FIGS. 13-17 and this alternative arrangement is the use of a dual range collar configuration to provide reduced axial dimensional requirements for planetary gearset 300 and range collar 320. FIGS. 19 and 20 provide structural details of transfer case 14A while FIGS. 20-25 are a sequential series of views illustrating the five (5) distinct range states established between the range clutch and the planetary gearset. As seen, a second range collar 500 is splined via a splined connection 502 for rotation with, and sliding axial movement relative to, range collar 320. In addition, the attachment of planet carrier plates 338A, 338B via elongated bolts 504 to establish planet carrier unit 304 is shown.

Figure 21:
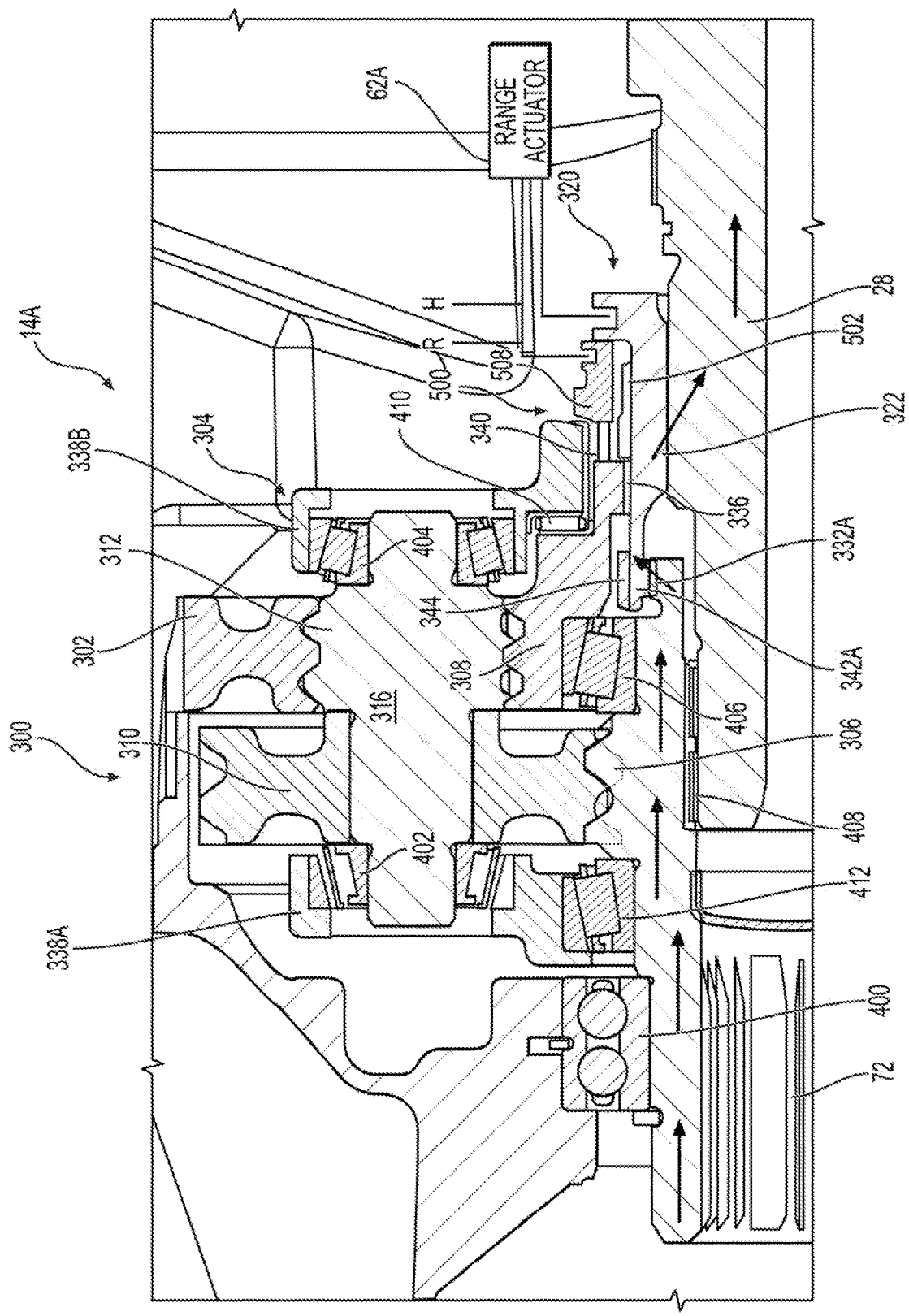
FIG. 21 is an enlarged sectional view of the three-speed transfer case shown in FIGS. 19 and 20 illustrating a two-component range clutch interacting with the planetary-type reduction gearset to establish the high-range drive connection.

FIG. 21 illustrates range collar 320 located in its high range (H) position while second range collar 500 is shown located in a first or "released" (R) position. With range collar 320 in its H range position, its first range teeth 342A are meshed with first clutch teeth 332A on extension segment 330 of input shaft 72. With second range collar 500 in its released (R) position, its radially-extending exterior range teeth 508 are disengaged from third clutch teeth 340 on second carrier ring 338B. As such, drive torque is transmitted at the direct ratio from input shaft 72 to rear output shaft 28 via range collar 320.

Figure 22:
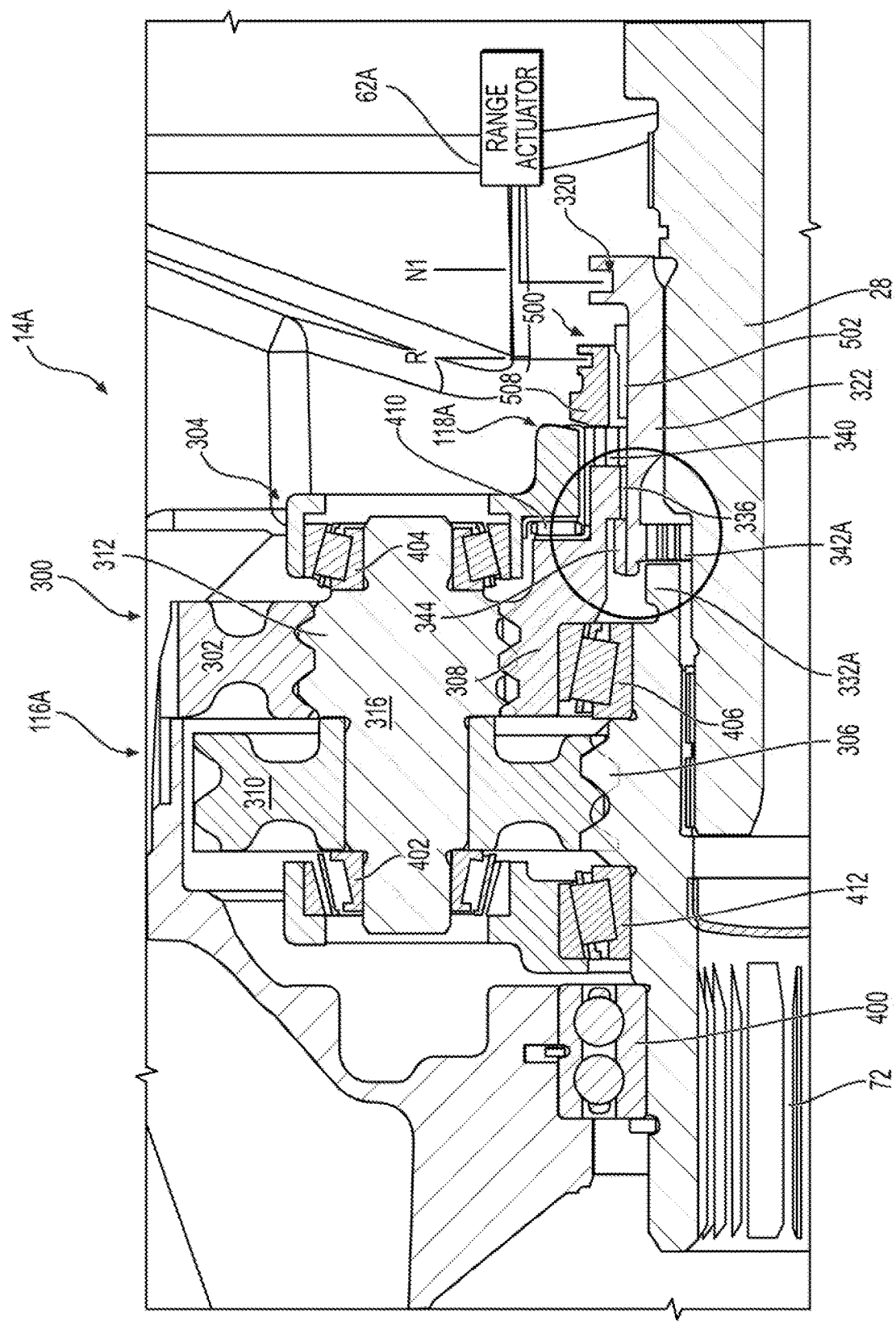
FIG. 22 is similar to FIG. 21 but now shows the two-component range clutch interacting with the planetary-type reduction gearset to establish the first neutral state.

FIG. 22 illustrates movement of range collar 320 axially from its H range position into its first Neutral (N1) position while second range collar 500 is maintained in its released (R) position. With range collar 320 located in this N1 position, its first range teeth 342A are disengaged from first clutch teeth 322A and its second range teeth 344 are disengaged from second clutch teeth 336 on second sun gear 308. Thus, no drive torque is transferred from input shaft 72 to rear output shaft 28.

Figure 23:
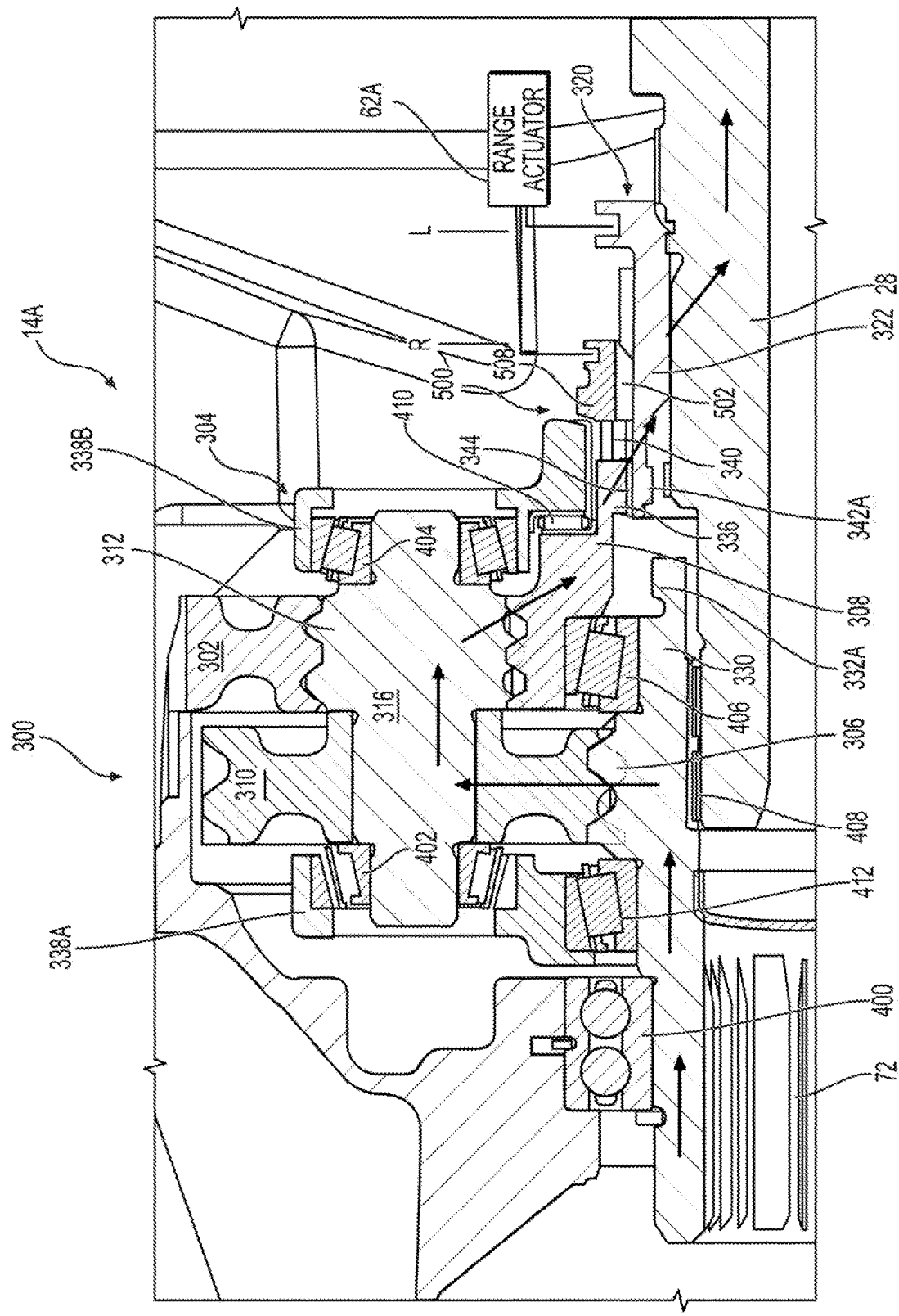
FIG. 23 is similar to FIGS. 21 and 22 but now shows the two-component range clutch interacting with the planetary-type reduction gearset to establish the low-range drive connection.

FIG. 23 illustrates continued axial movement of range collar 320 from its N1 position into its low-range (L) position while second range collar 500 is maintained in its released (R) position. With range collar 320 in its L range position, its second range teeth 344 are engaged with second clutch teeth 336 on second sun gear 308. In this way, the first reduced ratio drive connection is established between input shaft 72 and rear output shaft 28 through gearset 300 and range collar 320.

Figure 24:
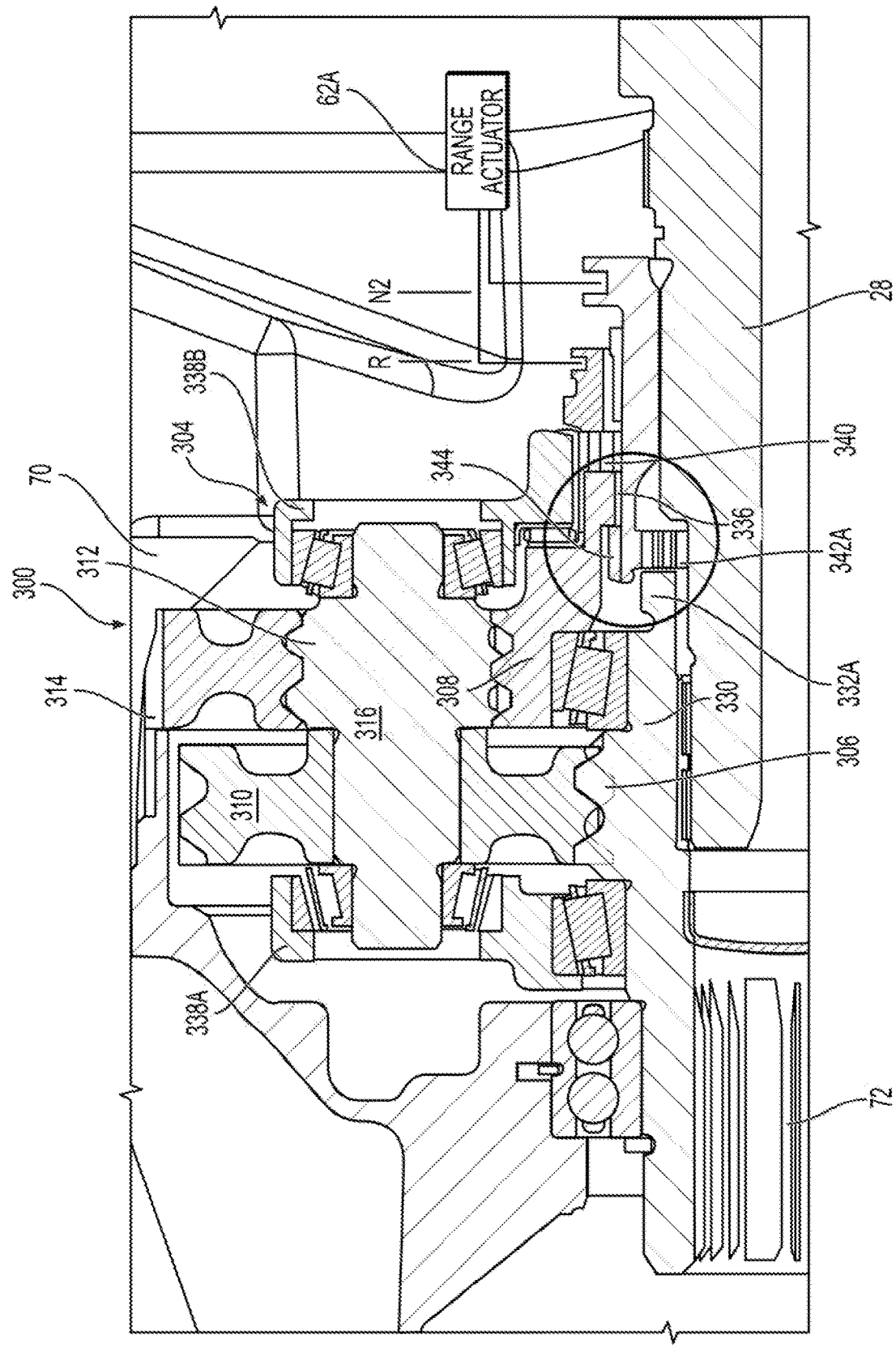
FIG. 24 is similar to FIGS. 21-23 but now shows the two-component range clutch interacting with the planetary-type reduction gearset to establish the second neutral state.
Figure 25:
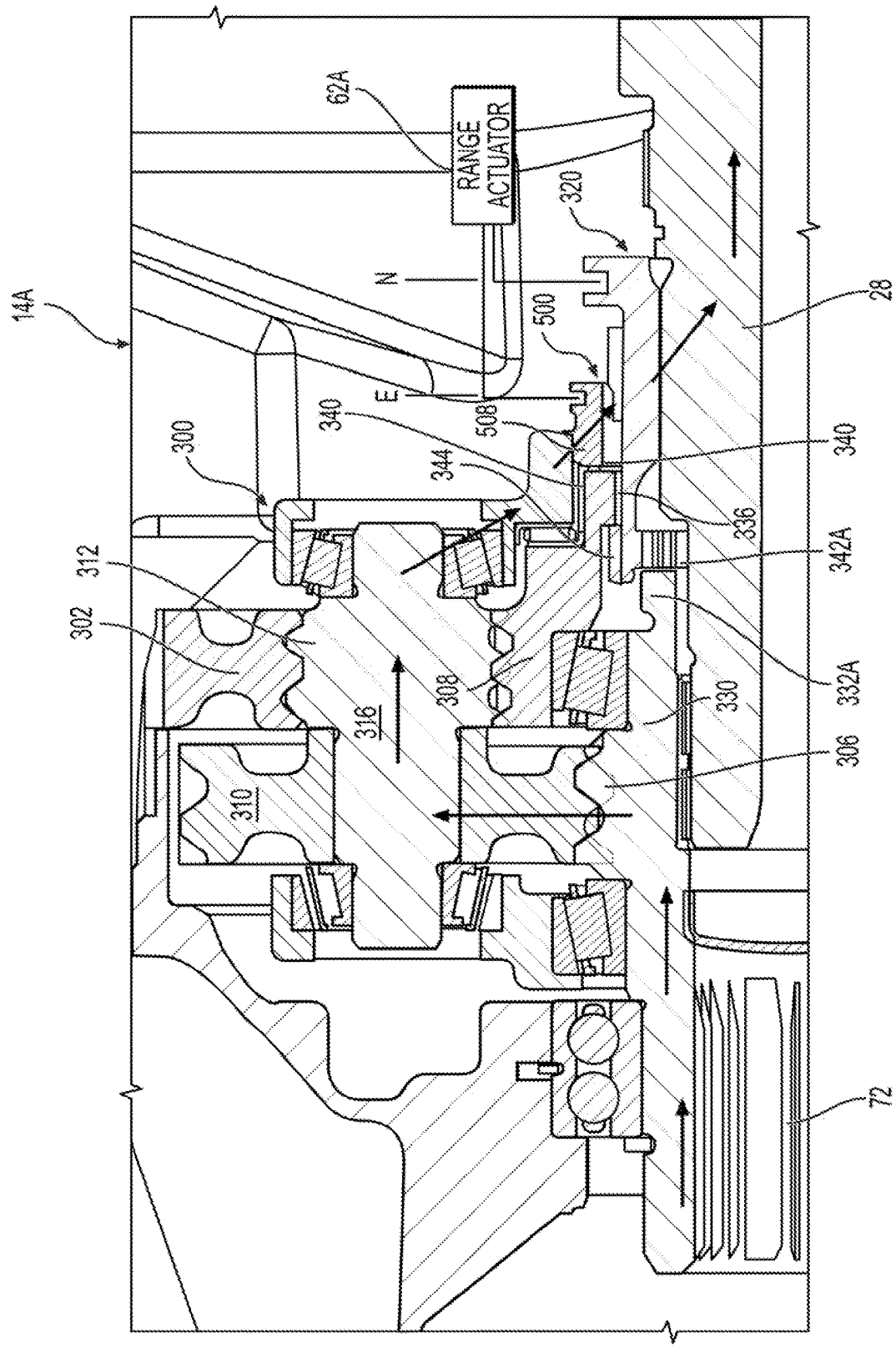
FIG. 25 is similar to FIGS. 21-24 but now shows the two-component range clutch interacting with the planetary-type reduction gearset to establish the crawler-range drive connection.

Referring now to FIGS. 24 and 25, the coordinated movement of range collar 320 and second range collar 500 (via range actuator 62A) is shown for shifting from the first reduced ratio (i.e., low-range) drive connection into the second reduced ratio (i.e., crawler-range) drive connection. Specifically, FIG. 24 illustrates movement of range collar 320 from its L range position (FIG. 23) back into its second neutral (N2) position whereby range collar 320 is disconnected from both input shaft 72 and second sun gear 308. Note that in this arrangement, the N1 and N2 positions of range collar 320 are common which permits a reduced axial length requirement. Following movement of range collar 320 to its N2 position, FIG. 25 illustrates axial movement of second range collar 500 from its released (R) position into a second or "engaged" (E) position. With second range collar 500 located in its engaged (E) position, its range teeth 508 are meshed with third clutch teeth 340 on carrier plate 338B of planet carrier unit 304. Since second range collar 500 is fixed via splined connection 502 to range collar 320, this dual range collar configuration functions to establish the second reduced ratio drive connection between input shaft 72 and rear output shaft 28.

The present disclosure provides several similar, yet distinct, alternative arrangements for a three-speed transfer case specifically configured to provide a pair of optimized reduced speed ratios for enhanced off-road functionality. It will be understood that the particular types of range shift systems, as well as mode shift systems, contemplated for use with the three-speed transfer cases of the present disclosure are not to be limited to the basic examples shown, but rather it is intended to include other well-known arrangements commonly used in two-speed transfer cases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A transfer case, comprising:
an input shaft adapted to be driven by a powertrain;
a first output shaft operably connected to a first driveline;
a second output shaft operably connected to a second driveline;
a transfer mechanism connected to the second output shaft;
a mode mechanism operable in a first mode state to couple the transfer mechanism to the first output shaft and in a second mode state to uncouple the transfer mechanism from the first output shaft;
a mode shift mechanism operable for shifting the mode mechanism between its first and second mode states;
a planetary gearset having a first sun gear driven by the input shaft, a second sun gear, a non-rotary ring gear, a carrier unit, first planet gears rotatably supported by the carrier unit and in constant mesh with the first sun gear, and second planet gears rotatably supported by the carrier unit and in constant mesh with the second sun gear and the ring gear;
a range mechanism operable in a first range state to establish a direct ratio drive connection between the input shaft and the first output shaft, operable in a second range state to establish a first reduced ratio drive connection between the second sun gear and the first output shaft, and operable in a third range state to establish a second reduced ratio drive connection between the carrier unit and the first output shaft; and
a range shift mechanism operable for shifting the range mechanism between its three distinct range states.

2. The transfer case of claim 1, wherein the range mechanism includes a range collar coupled for rotation with the first output shaft and axially moveable between at least three range positions for establishing each of the three distinct range states.

3. The transfer case of claim 2, wherein the range collar is operable in its first range position to couple one of the input shaft and the first sun gear to the first output shaft so as to establish the direct ratio drive connection therebetween, wherein the range collar is operable in its second range position to couple the second sun gear to the first output shaft so as to the first output shaft so as to establish the first reduced ratio drive connection between the input shaft and the first output shaft, and wherein the range collar is operable in its third range position to couple the carrier unit to the first output shaft so as to establish the second reduced ratio drive connection between the input shaft and the first output shaft.

4. The transfer case of claim 3, wherein one of the input shaft and the first sun gear includes first clutch teeth, the second sun gear includes second clutch teeth, and the carrier unit includes third clutch teeth, wherein the range collar is operable in its first range position to engage the first clutch teeth and disengage the second and third clutch teeth, wherein the range collar is operable in its third range position to engage the third clutch teeth and disengage the first and second clutch teeth.

5. The transfer case of claim 4, wherein the range collar includes first range teeth adapted to engage the first clutch teeth when located in its first range position, wherein the range collar includes second range teeth adapted to engage the second clutch teeth when located in its second range position, and wherein the range collar includes third gear teeth adapted to engage the third clutch teeth when the range collar is located in its third range position.

6. The transfer case of claim 5, wherein a first neutral position is established between the first and second range positions and a second neutral position is established between the second and third range positions, wherein the range collar is uncoupled from either the input shaft or the planetary gearset in each of the first and second neutral positions.

7. The transfer case of claim 4, wherein the range collar includes first range teeth adapted to engage the first clutch teeth when located in its first range position, wherein the range collar includes second range teeth adapted to engage the second clutch teeth when located in its second range position and to engage the third clutch teeth when located in its third range position.

8. The transfer case of claim 7, wherein a first neutral position is established between the first and second range positions and a second neutral position is established between the second and third range positions, wherein the range collar is uncoupled from either the input shaft or the planetary gearset in each of the first and second neutral positions.

9. The transfer case of claim 4, wherein the range collar includes first and second range teeth, wherein a second range collar is fixed for rotation with the range collar and axial movement thereon between a released position and an engaged position, wherein the first range teeth engage the first clutch teeth when the range collar is in its first range position and third range teeth on the second range collar are disengaged from the third clutch teeth when the second range collar is in its released position to establish the direct ratio drive connection, wherein the second range teeth engage the second clutch teeth when the range collar is in its second range position and the third range teeth are disengaged from the third clutch teeth when the second range collar is in its released position to establish the first reduced ratio drive connection, and wherein movement of the range collar to a neutral position between its first and second range positions and movement of the second range collar to its engaged position establishes the second reduced ratio drive connection.

10. The transfer case of claim 1, further including a disconnect clutch operable in a first state to connect the input shaft to the first sun gear and in a second state to disconnect the input shaft from the first sun gear.

11. The transfer case of claim 1, wherein the first reduced ratio is less than 2.5:1 and the second reduced ratio is greater than 5.0:1.

12. A transfer case, comprising:
an input shaft adapted to be driven by a powertrain;
a first output shaft operably connected to a first driveline;
a second output shaft operably connected to a second driveline;
a transfer mechanism connected to the second output shaft;
a mode mechanism operable in a first mode state to couple the transfer mechanism to the first output shaft and in a second mode state to uncouple the transfer mechanism from the first output shaft;
a mode shift mechanism operable for shifting the mode mechanism between its first and second mode states;
a planetary gearset having a first sun gear driven by the input shaft, a second sun gear, a non-rotary ring gear, a carrier unit, first planet gears rotatably supported by the carrier unit and in constant mesh with the first sun gear, and second planet gears rotatably supported by the carrier unit and in constant mesh with the second sun gear and the ring gear;
a range mechanism operable in a first range state to establish a direct ratio drive connection between the input shaft and the first output shaft, operable in a second range state to establish a first reduced ratio drive connection between the second sun gear and the first output shaft, and operable in a third range state to establish a second reduced ratio drive connection between the carrier unit and the first output shaft; and
the range shift mechanism operable for shifting the range mechanism between more than three distinct range states.

13. The transfer case of claim 12, wherein the more than three distinct range states includes five range positions for establishing each of five distinct range states.

14. The transfer case of claim 13, wherein the five distinct range states includes three driving states and two non-driving states.

15. The transfer case of claim 14, wherein the range mechanism includes a range collar coupled for rotation with the first output shaft and axially moveable between the plurality of distinct ranges states.

16. The transfer case of claim 15, wherein the range collar is operable in a first range position to couple one of the input shaft and the first sun gear to the first output shaft so as to establish the direct ratio drive connection therebetween, wherein the range collar is operable in a first neutral position so as to establish a disengagement between the input shaft and the first output shaft, wherein the range collar is operable in a second range position to couple the second sun gear to the first output shaft so as to the first output shaft so as to establish the first reduced ratio drive connection between the input shaft and the first output shaft, wherein the range collar is operable in a second neutral position so as to establish a disengagement between the input shaft and the first output shaft, and wherein the range collar is operable in a third range position to couple the carrier unit to the first output shaft so as to establish the second reduced ratio drive connection between the input shaft and the first output shaft.

17. The transfer case of claim 16, wherein one of the input shaft and the first sun gear includes first clutch teeth, the second sun gear includes second clutch teeth, and the carrier unit includes third clutch teeth, wherein the range collar is operable in its first range position to engage the first clutch teeth and disengage the second and third clutch teeth, wherein the range collar is operable in its third range position to engage the third clutch teeth and disengage the first and second clutch teeth.

18. The transfer case of claim 17, wherein the range collar includes first range teeth adapted to engage the first clutch teeth when located in its first range position, wherein the range collar includes second range teeth adapted to engage the second clutch teeth when located in its second range position and to engage the third clutch teeth when located in its third range position.

19. The transfer case of claim 18, wherein the first range teeth are disengaged from first clutch teeth and the second range teeth are disengaged from the second clutch teeth the on second sun gear in the first neutral position, wherein the first range teeth are disengaged from first clutch teeth and the second range teeth are disengaged from the third clutch teeth the on second sun gear in the second neutral position, and wherein a positioning of the range collar in the first neutral position and a positioning of the range collar in the second neutral position are common.

20. The transfer case of claim 19, wherein the range collar includes first and second range teeth, wherein a second range collar is fixed for rotation with the range collar and axial movement thereon between a released position and an engaged position, wherein the first range teeth engage the first clutch teeth when the range collar is in its first range position and third range teeth on the second range collar are disengaged from the third clutch teeth when the second range collar is in its released position to establish the direct ratio drive connection, wherein the second range teeth engage the second clutch teeth when the range collar is in its second range position and the third range teeth are disengaged from the third clutch teeth when the second range collar is in its released position to establish the first reduced ratio drive connection, and wherein movement of the range collar to a neutral position between its first and second range positions and movement of the second range collar to its engaged position establishes the second reduced ratio drive connection.

\* \* \* \* \*